United States Patent
Hu et al.

(10) Patent No.: US 11,817,242 B2
(45) Date of Patent: Nov. 14, 2023

(54) MAGNONIC ELECTROMAGNETIC RADIATION SOURCES WITH HIGH OUTPUT POWER AT HIGH FREQUENCIES

(71) Applicant: Wisconsin Alumni Research Foundation, Madison, WI (US)

(72) Inventors: Jiamian Hu, Middleton, WI (US); Shihao Zhuang, Madison, WI (US); Mingrui Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/528,937

(22) Filed: Nov. 17, 2021

(65) Prior Publication Data

US 2023/0154662 A1  May 18, 2023

(51) Int. Cl.
*H01F 10/32* (2006.01)
*H01F 41/30* (2006.01)
*G01N 21/17* (2006.01)
*G02F 1/11* (2006.01)
*G02B 6/293* (2006.01)

(52) U.S. Cl.
CPC ..... *H01F 10/3259* (2013.01); *G01N 21/1702* (2013.01); *G02B 6/29301* (2013.01); *G02F 1/11* (2013.01); *H01F 10/3254* (2013.01); *H01F 41/302* (2013.01); *Y10T 428/32* (2015.01)

(58) Field of Classification Search
None
See application file for complete search history.

(56) References Cited

U.S. PATENT DOCUMENTS

| 4,614,923 | A | * | 9/1986 | Roveda | H03H 2/001 333/147 |
| 5,501,913 | A | * | 3/1996 | Shimokawa | H01F 10/3209 252/62.51 R |
| 5,589,261 | A | * | 12/1996 | Tamari | H01F 10/3218 427/127 |
| 6,759,137 | B1 | * | 7/2004 | Furuya | G11B 11/10584 428/167 |
| 7,652,769 | B2 | | 1/2010 | Zhao et al. | |
| 10,161,790 | B2 | | 12/2018 | Ding et al. | |
| 10,475,564 | B2 | * | 11/2019 | Thomas | H01F 41/307 |
| 11,112,355 | B2 | | 9/2021 | Hu et al. | |
| 11,169,402 | B2 | * | 11/2021 | Jin | H01F 10/3245 |

(Continued)

FOREIGN PATENT DOCUMENTS

| CN | 108023263 A | 5/2018 |
| CN | 110535003 A | 12/2019 |

OTHER PUBLICATIONS

Chiang et al. (J. Mag. Mag. Mat., 239, 2002, 332-334. (Year: 2002).*

(Continued)

*Primary Examiner* — Kevin M Bernatz
(74) *Attorney, Agent, or Firm* — Bell & Manning, LLC

(57) ABSTRACT

Acoustically mediated pulsed radiation sources, phased arrays incorporating the radiation sources, and methods of using the radiation sources and phased arrays to generate electromagnetic radiation via magnetic dipole emission are provided. The radiation sources are based on a superlattice heterostructure that supports in-phase magnetic dipole emission from a series of magnetic insulator layers disposed along the length of the heterostructure.

18 Claims, 14 Drawing Sheets

(56) References Cited

U.S. PATENT DOCUMENTS

| | | | |
|---|---|---|---|
| 11,199,447 B1* | 12/2021 | Hu | H01S 1/02 |
| 2002/0067480 A1 | 6/2002 | Takahashi | |
| 2003/0235717 A1* | 12/2003 | van de Veerdonk | G11B 5/66 428/836.3 |
| 2008/0151615 A1* | 6/2008 | Rodmacq | H01F 41/30 204/192.15 |
| 2009/0219602 A1* | 9/2009 | Alameh | H01F 10/265 359/280 |
| 2012/0113417 A1 | 5/2012 | Linfield et al. | |
| 2013/0312802 A1* | 11/2013 | Kirihara | H10N 15/20 136/201 |
| 2017/0104150 A1* | 4/2017 | Shi | H10N 52/01 |
| 2017/0199402 A1* | 7/2017 | Sun | G02F 1/0955 |
| 2019/0227404 A1 | 7/2019 | Wu et al. | |
| 2019/0385655 A1* | 12/2019 | Lin | H10B 61/22 |
| 2020/0067198 A1 | 2/2020 | Hunziker | |
| 2021/0055162 A1* | 2/2021 | Rice | G01J 5/10 |
| 2021/0199571 A1* | 7/2021 | Hu | G02F 2/02 |
| 2022/0328757 A1* | 10/2022 | Pereira de Sousa | G11C 11/161 |

OTHER PUBLICATIONS

J.-M. Hu, et al., "Purely Electric-Field-Driven Perpendicular Magnetization Reversal," *Nano Letters*, 15, 616 (2015).

J.-M. Hu, et al., "Fast Magnetic Domain-Wall Motion in a Ring-Shaped Nanowire Driven by a Voltage," *Nano Letters*, 16, 2341 (2016).

J.-M. Hu, et al., "High-density magnetoresistive random access memory operating at ultralow voltage at room temperature," *Nature Communications*, 2, 1(2011).

G. P. Carman et al., "Strain-mediated magnetoelectrics: Turning science fiction into reality,", *MRS Bulletin*, 43, 822 (2018).

J.-M. Hu, et al., "Strain-mediated voltage controlled switching of magnetic skyrmions in nanostructures," *npj Computational Materials*, 4, 1(2017).

J.-M. Hu, et al., "Stability and dynamics of skyrmions in ultrathin magnetic nanodisks under strain," *Acta Materialia*, 183, pp. 145-154 (2020).

S. Zhuang et al., "An Ultra-narrowband, Acoustically Mediated Spintronic Terahertz Emitter," arXiv preprint arXiv:2005.00629 (2020).

Feng et al., "Photonic Structure Enhanced Spintronic Terahertz Emitter," published in 2019 $44^{th}$ International Conference on Infrared, Millimeter, and Terahertz Wave, 2 pages, Sep. 2019.

Gao et al, "Coherent control of femtosecond spin current investigated by polarization dependent terahertz emission spectroscopy in ferromagnetic heterostructures," 2018 IEEE $43^{rd}$ International Conference on Infrared, Millimeter and Terahertz Waves, 2018.

Uchida et al., "Acoustic spin pumping: Direct generation of spin currents from sound waves in $Pt/Y_3Fe_5O_{12}$ hybrid structures," Journal of Applied Physics 111, 053903 (2012), 8 pages.

Weiler et al., "Spin pumping with coherent elastic waves," Phys. Rev. Lett. 108, 176601—Apr. 23, 2020, 8 pages.

Masayoshi Tonouchi, "Cutting-edge terahertz technology," Nature Photonics, vol. 1, Feb. 2007, pp. 97-105.

Henighan et al., "Generation mechanism of terahertz coherent acoustic phonons in Fe," Physical review B 93, 2016, pp. 220301-1 to 220301-5.

Gobaut et al., "FeGaMgO/Fe/GaAs(001) magnetic tunnel junction: Growth and magnetic properties," Journal of Magnetism and Magnetic Materials 383 (2015) pp. 56-59.

Ferguson, B et al.,Materials for terahertz science and technology. Nature Mater 1, 26-33 (2002). https://doi.org/10.1038/nmat708.

Ho, L., et al., Nature Photon 2, 541-543 (2008). https://doi.org/10.1038/nphoton.2008.174.

Garik Torosyan et al., "Optimized Spintronic Terahertz Emitters Based on Epitaxial Grown Fe/Pt Layer Structures," Scipentific Reports, pp. 1-9, Jan. 22, 2018.

A.V. Scherbakov et al., "Optical Excitation of Single- and Multimode Magnetization Precession in Fe—Ga Nanolayers," Physical Review Applied, pp. 1-7, May 2, 2019.

Valynn Katrine Mag-Usara et al, "Spintronic Thz Generation Using a Silicon-based Fe/Pt Bilayer as the Radiation Scorce," 2019 $44^{th}$ International Conference on Infrared, Millimeter, and Terahertz Waves (IIRMMW-THz), pp. 1-2, Oct. 21, 2019.

U. Nandi et al., "Antenna-coupled spintronic terahertz emitters driven by a 1550 nm femtosecond laser oscillator," Applied Physics Letters, pp. 1-5, Jul. 9, 2019.

International Search Report and Written Opinion for PCT/US2022/042490 dated Dec. 22, 2022; pp. 1-10.

* cited by examiner

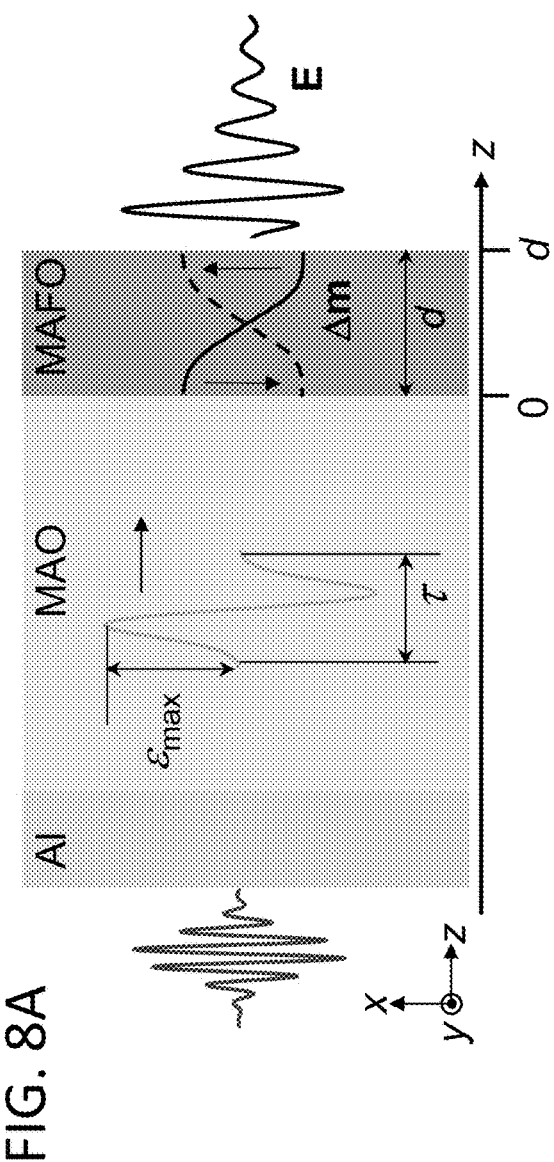
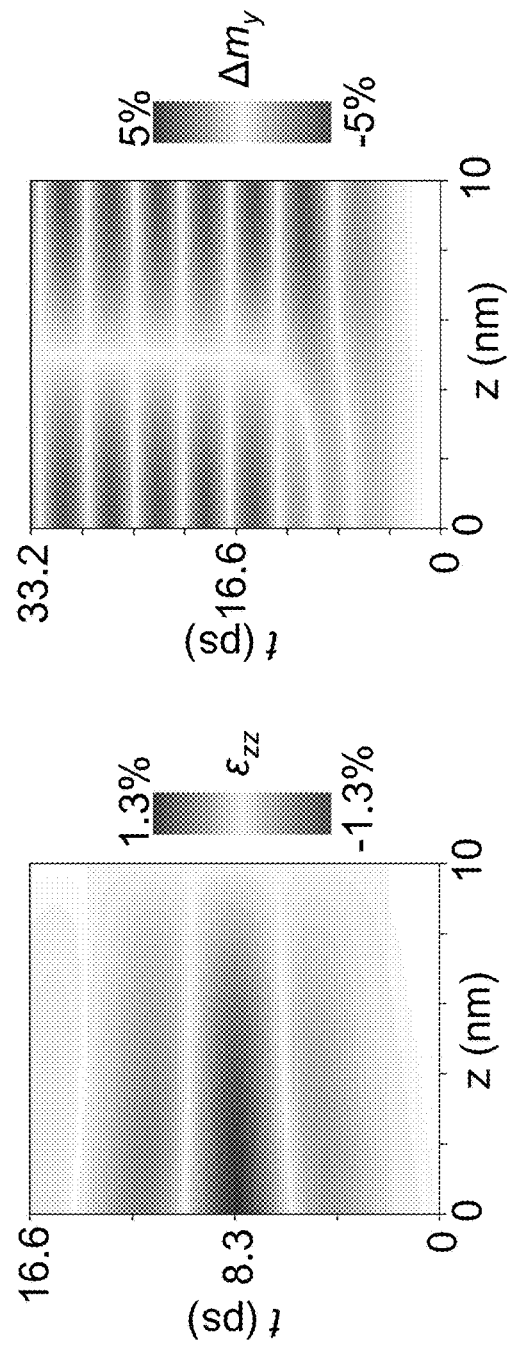
FIG. 8A
FIG. 8B
FIG. 8C

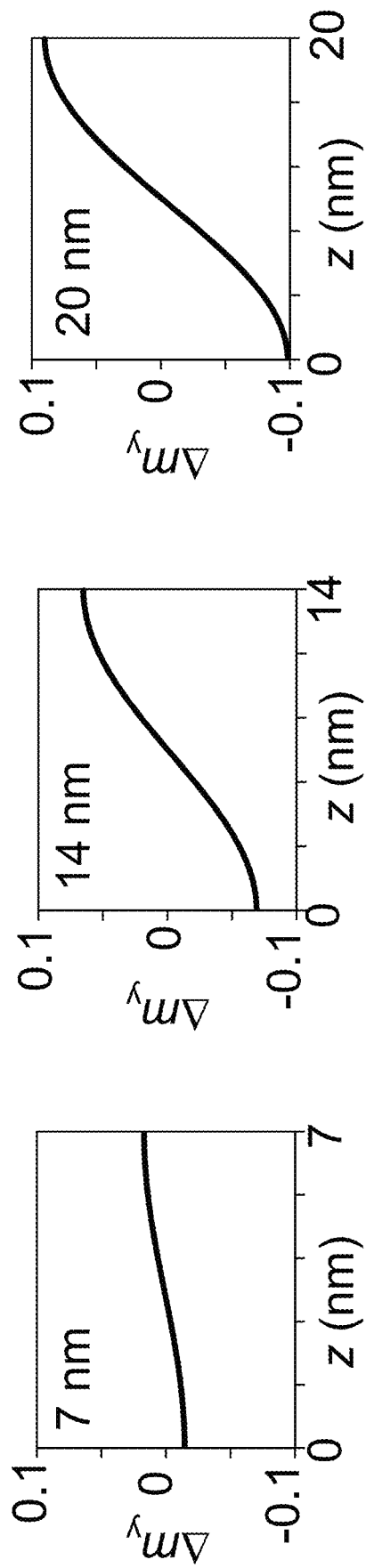

MAGNONIC ELECTROMAGNETIC RADIATION SOURCES WITH HIGH OUTPUT POWER AT HIGH FREQUENCIES

BACKGROUND

Millimeter wave (mmW), which refers to electromagnetic radiation with a frequency of 30-300 GHz, has found numerous applications in modern society. For example, mmW spectroscopy has been used for chemical analysis because many chemicals exhibit signature resonance modes within the mmW band. Moreover, the small wavelength of mmW makes it suitable for use in high-resolution imaging. Due to the rich spectrum availability, mmW wireless communication supports wider bandwidth for data transmission and hence high data rates. Thus far, it has been demonstrated that mmWs with frequencies of 28 and 38 GHz can be used in the 5th cellular network technology (5G), with the data rate reaching the order of gigabytes per second (Gb/s). (Rappaport, T. S. et al. *IEEE access* 1, 335-349 (2013).) Moreover, mmW radar sensors utilizing a frequency range of 76-81 GHz have been used for autonomous driving, allowing the transmission of a significantly larger amount of data than lower-frequency operation. (Hasch, J. et al. *IEEE Trans. Microw. Theory Tech.* 60, 845-860 (2012).) Although the use of higher frequency mmWs would enable even higher lateral resolution in imaging and a higher data rate in communication, the inverse power-frequency relationship of existing solid-state mmW emitters has led to limited output power at higher frequencies. For instance, the output power of the Impact ionization Avalanche Transit Time (IMPATT) diode, which produces the highest output power among existing mmW emitters, is proportional to $1/f^2$ when the frequency f exceeds 100 GHz. (Aghasi, H. et al. *Appl. Phys. Rev.* 7, 21302 (2020).) This is mainly because the optimum junction area of the diode is proportional to $1/f^2$ due to the device-circuit impedance matching. Although this issue can be mitigated by fabricating multi-element emitter arrays to combine the signals of individual emitter spatially, a fundamental solution to improving the output power of an individual emitter would be more appealing.

SUMMARY

Acoustically mediated pulsed radiation sources, phased arrays incorporating the radiation sources, and methods of using the radiation sources and phased arrays are provided.

One example of a heterostructure includes: a metal layer; and a superlattice acoustically coupled to the metal layer, the superlattice comprising a series of adjacent bilayers disposed along a length axis, each bilayer comprising a magnetic insulator layer and a dielectric layer, wherein the magnetic insulator layers in the superlattice have equal thicknesses and the dielectric layers in the superlattice have equal thicknesses.

One example of a radiation source for emitting electromagnetic radiation includes: a light-to-acoustic transducer layer; and a superlattice acoustically coupled to the light-to-acoustic transducer layer, the superlattice comprising a series of adjacent bilayers disposed along a length axis, each bilayer comprising a magnetic insulator layer and a dielectric layer, wherein the magnetic insulator layers in the superlattice have equal thicknesses and the dielectric layers in the superlattice have equal thicknesses; and a femtosecond pulsed laser optically coupled to the light-to-acoustic transducer layer, opposite the thermal insulation layer.

One example of a method of generating electromagnetic radiation from a superlattice comprising a series of adjacent bilayers disposed along a length axis, each bilayer comprising a magnetic insulator layer and a dielectric layer, wherein the magnetic insulator layers in the superlattice have equal thicknesses and the dielectric layers in the superlattice have equal thicknesses, includes the steps of: passing an acoustic pulse through the superlattice, along the length axis, the duration of the acoustic pulse being selected such that the acoustic pulse selectively excites an n=1 mode standing spin wave in each magnetic insulator layer of the superlattice, and the n=1 mode standing spin waves of the magnetic insulator layers are in-phase, wherein the in-phase standing spin waves generate electromagnetic radiation via magnetic dipole emission.

One example of a phased array includes: a plurality of radiation sources for emitting electromagnetic radiation, the radiation sources including: a light-to-acoustic transducer layer; and at least one magnetic layer optically coupled to the light-to-acoustic transducer layer; and a laser system comprising: at least one femtosecond pulsed laser for generating a plurality of femtosecond pulsed laser beams that are optically coupled to the light-to-acoustic transducer layers of the radiation sources; and a time delay control system for introducing an adjustable time delay in the femtosecond pulsed laser beams arriving at the light-to-acoustic transducer layers of the radiation sources.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 8A shows the design of a magnonic mmW pulsed emitter based on a metal/dielectric/magnetoelastic heterostructure, using an Al/MAO/MAFO heterostructure as an illustrative example.

FIG. 8B shows the spatiotemporal profile of an acoustic pulse in the MAFO film of the magnonic mmW pulsed emitter of FIG. 8A.

FIG. 8C shows the spatiotemporal profile of an excited spin wave within t=0-33.2 ps of the magnonic mmW pulsed emitter of FIG. 8A.

FIG. 8E (bottom panel) shows that the spectral amplitude of the acoustic pulse was only appreciable below 300 GHz.

FIG. 9C shows the peak amplitudes of the standing spin waves of the emitters of FIG. 9B.

DETAILED DESCRIPTION

Acoustically mediated pulsed radiation sources, phased arrays incorporating the radiation sources, and methods of using the radiation sources and phased arrays are provided. The radiation sources are based on a superlattice heterostructure that supports in-phase magnetic dipole emission from a series of magnetic insulator layers disposed along the length of the heterostructure.

The radiation sources can be designed to emit radiation with a high output power at a wide range of frequencies, including mmW radiation having frequencies in the range from 30 GHz to 300 GHz. As a result, the radiation sources are well suited for use in wireless communication applications that require high data rates. For example, radiation sources emitting in the mmW range can operate with frequencies of 28 GHz and 38 GHz, which are useful for 5G applications. The radiation sources are also well suited for high spatial resolution imaging and radar sensors for use in such applications as autonomous driving.

Figure 1A:
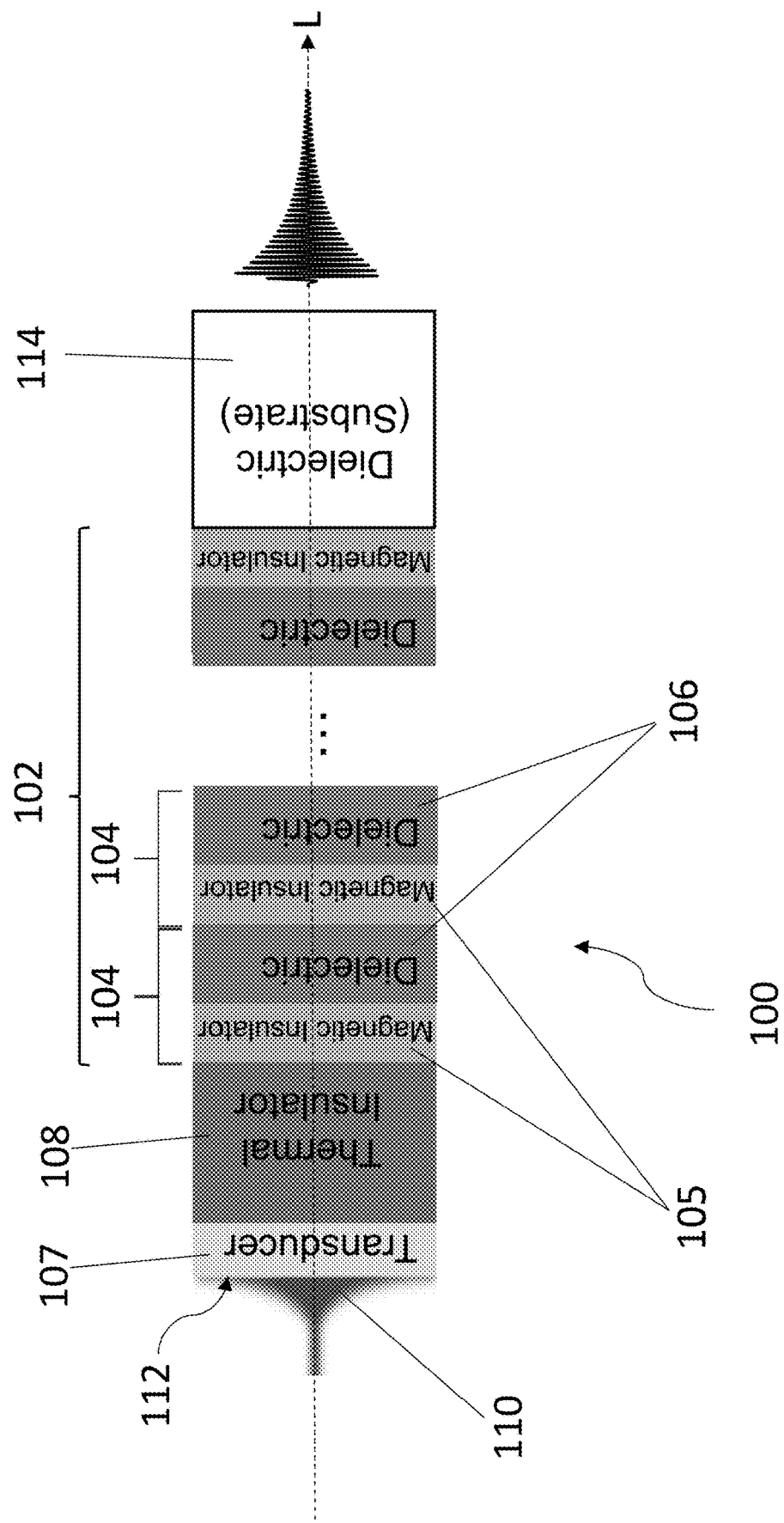
FIG. 1A is a schematic diagram of an acoustically mediated, superlattice-based radiation source that uses MAFO as a magnetic insulator in the superlattice and includes a dielectric substrate for epitaxial superlattice growth at its terminal end.

A schematic diagram of one embodiment of an acoustically mediated pulsed radiation source 100 is shown in FIG. 1A. The radiation emission is based on a superlattice 102 formed from a series of alternating layers of a non-magnetic dielectric material 106 and a magnetic insulator material 105 disposed along a length axis (L), with a bilayer 104 as the monolithic unit. (The ellipses in the figure indicate that additional bilayers may be included along the length axis.) In the superlattice, magnetic insulator layers 105 have equal thicknesses and non-magnetic dielectric layers 106 have equal thicknesses, such that each bilayer 104 has the same thickness. (For the purposes of this disclosure, the thickness dimension is along length axis, L.) The superlattice structures can be represented as (MI)$_m$/(DE)$_n$, where MI stands for magnetic insulator, DE stands for dielectric, m is the number of magnetic insulator layers in the superlattice, and n is the number of non-magnetic dielectric layers in the superlattice. Notably, while m and n can be equal (as is the case in FIG. 1A), they need not be. For example, a superlattice may include one additional magnetic insulator layer 105 or one additional dielectric layer 106. Moreover, although the first and last layer of superlattice 102 in FIG. 1A are magnetic insulator layers 105, it is also possible for the first layer of a superlattice to be a dielectric layer and/or for the last layer of a superlattice to be a dielectric layer. Radiation source 100 further includes a transducer layer 107 that serves as a light-to-acoustic transducer and, optionally, a thermal insulation layer 108 disposed between metal layer 107 and superlattice 102. The embodiment of the radiation source shown in FIG. 1A includes a dielectric substrate 114 at the distal end of superlattice 102. Dielectric substrate 114 can serve as a growth substrate for the epitaxial growth of superlattice 102 and, therefore, may be composed of a material upon which superlattice 102 can be epitaxially grown. The substrate is transparent to the emitted radiation and can be used to protect the superlattice from mechanical damage. For a material to be transparent to the emitted radiation, it need not transmit 100% of the emitted electromagnetic wave. Rather, it need only transmit enough of the emitted electromagnetic wave to render the radiation source suitable for its intended purpose. Thus, materials that transmit at least 70% of the output signal, at least 80% of the output signal, or at least 90% of the output signal can be characterized as transparent. Other suitable support substrate materials include quartz, sapphire, glass, and silicon.

Figure 1B:
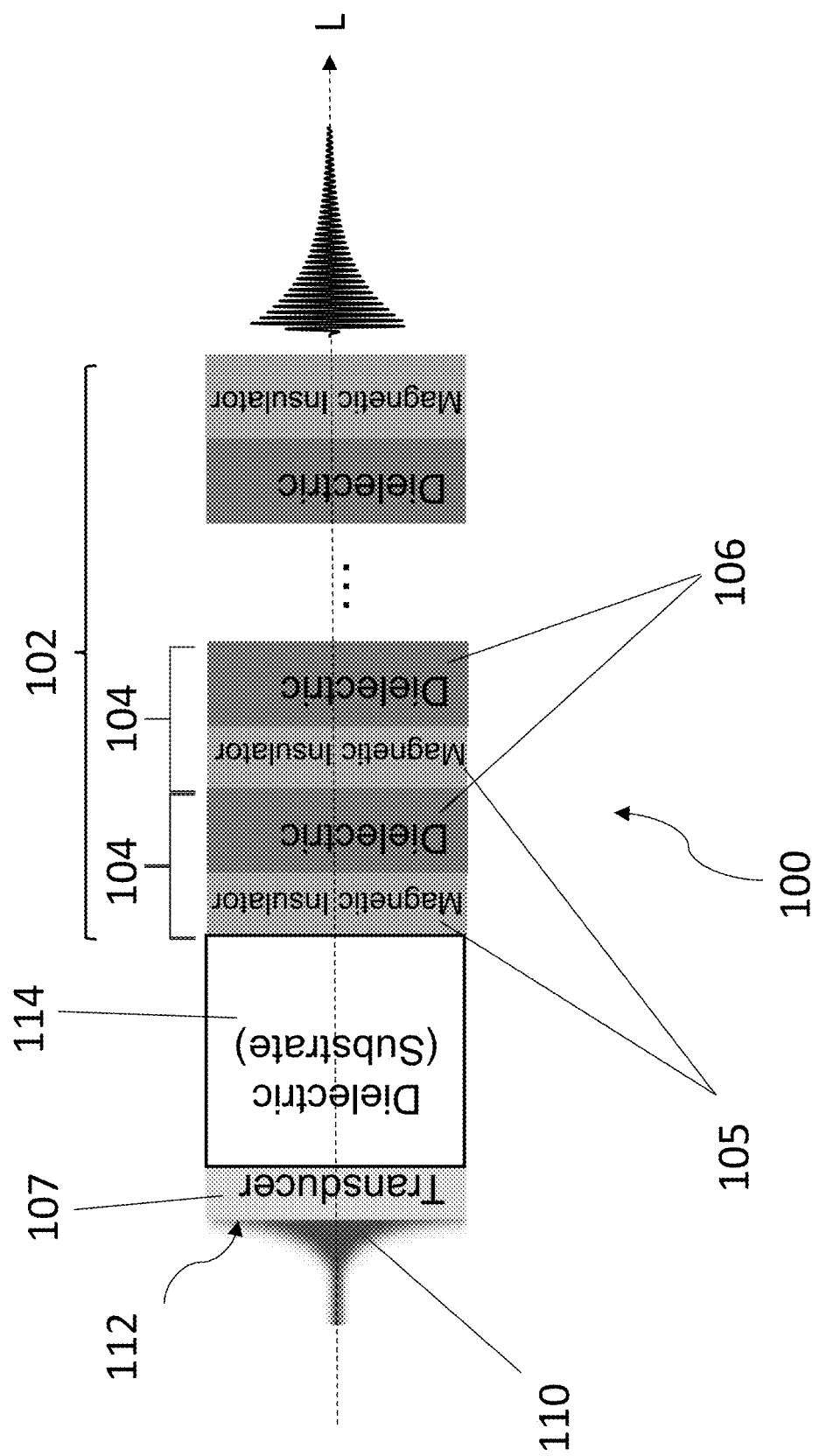
FIG. 1B is a schematic diagram of an acoustically mediated, superlattice-based radiation source that uses MAFO as a magnetic insulator in the superlattice and includes a dielectric substrate for epitaxial superlattice growth adjacent to a light-to-acoustic transducer layer.

An alternative embodiment of an acoustically mediated pulsed radiation source 100 is shown in FIG. 1B. This embodiment differs from the embodiment of FIG. 1A in that dielectric substrate 114 is not located at the distal end of superlattice 102. Instead, in the radiation source of FIG. 1B, dielectric substrate 114 is located next to light-to-acoustic transducer layer 107 and serves as an epitaxial growth substrate for superlattice 102. If present, a dielectric substrate 114 in this position can also provide thermal insulation for superlattice 102.

Figure 1C:
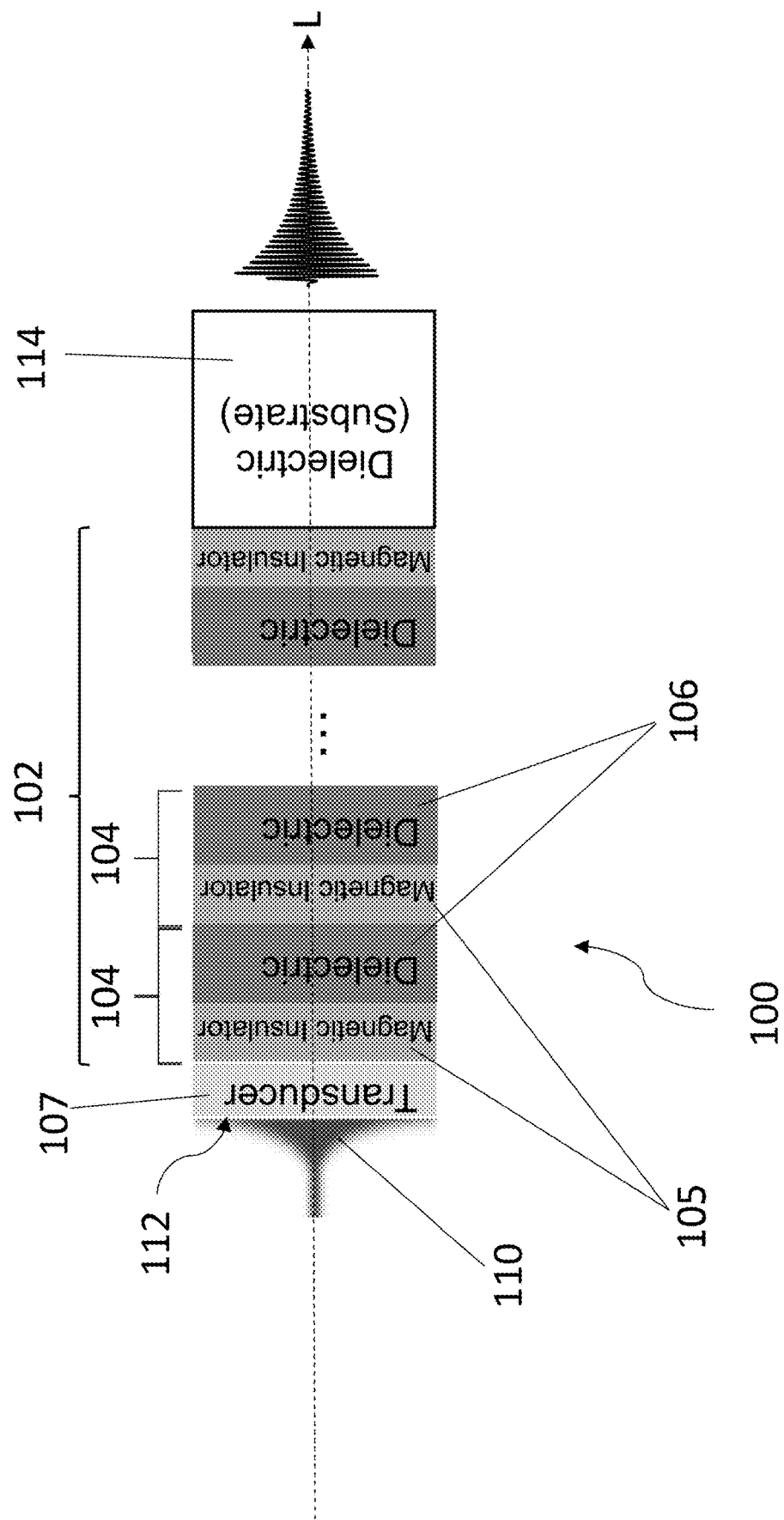
FIG. 1C is a schematic diagram of an acoustically mediated, superlattice-based radiation source that uses MAFO as a magnetic insulator in the superlattice that omits the thermal insulator layer.

Yet another embodiment of an acoustically mediated pulsed radiation source 100 is shown in FIG. 1C. This embodiment differs from the embodiment of FIG. 1A in that it lacks thermal insulator layer 108. In each of the embodiments of the acoustically mediated pulsed radiation sources, superlattice 102 is acoustically coupled to light-to-acoustic transducer layer 107. For the purposes of this disclosure, the phrase "acoustically coupled" means that the superlattice is positioned with respect to the light-to-acoustic transducer layer such that acoustic pulses generated in the light-to-acoustic transducer layer are able to travel from the light-to-acoustic transducer layer into the superlattice. Acoustic coupling can be achieved by placing the superlattice directly adjacent to the light-to-acoustic layer, as illustrated in FIG. 1C. However, a superlattice can be acoustically coupled to a light-to-acoustic transducer layer even if there are one or more intervening layers (for example, the thermal insulator layer 108 or dielectric substrate 114 of FIGS. 1A and 1B), provided that acoustic pulses generated in the light-to-acoustic transducer layer can traverse the intervening layer and be injected into the superlattice.

Thermal insulation layer 108 and/or dielectric substrate 114 may be composed of the same material as dielectric layers 106, although it will generally be thicker than those layers. If it acts as an epitaxial growth substrate for magnetic insulator layer 105, dielectric layer 114 will be a single-crystalline substrate, for example, a MAO single crystal can be used as a growth substrate for a MAFO magnetic insulator layer.

Without intending to be bound to any particular theory of the invention, the principles of operation of the radiation sources can be explained as follows. During operation, a pulsed light source, such as a femtosecond (fs) laser, directs fs-time scale pulses of light 110 onto a light receiving surface 112 of transducer layer 107. Transducer layer 107 acts as a light-to-acoustic transducer to convert the femtosecond timescale laser pulses into fast (e.g., picosecond timescale) acoustic pulses ($\varepsilon_{zz}$) that are injected into the first magnetic insulator layer of superlattice 102. (Acoustic pulses are also referred to herein as strain pulses.) As the acoustic wave traverses superlattice 102 along its length, it excites spin waves in magnetic insulator layers 105 through magnetoelastic coupling. (For this reason, magnetic insulator layers are also referred to herein as magnetoelastic layers.) The spin waves propagate together with the injected acoustic pulse along the magnetic insulator layers 105 and are completely reflected at the surfaces of the magnetic insulator layers 105. A standing spin wave forms due to the interference between the incident and the reflected spin waves. The standing spin waves give rise to the emission of electromagnetic wave through magnetic dipole radiation.

Magnetic insulator layers 105 are composed of a magnetic material having a sufficiently strong magnetoelastic coupling between the spins and the strains to generate spin waves in the magnetic insulator. However, layers 105 should also be electrical insulators in order to avoid the absorption of the emitted radiation. The magnetic insulator layers also desirably have sufficiently low magnetic damping to allow the radiation sources to operate at the energy efficiency and duration requirements for their intended application, and to achieve excited standing spin waves with long lifetimes, including lifetimes of approximately 1 ns. $MgAl_{0.5}Fe_{1.5}O_4$ (MAFO) is one example of a low-damping magnetic insulator with high magnetoelastic coupling properties. However, other magnetic insulators, such as yttrium-iron-garnet ($Y_3Fe_5O_{12}$; "YIG") and gadolinium-iron garnet ($Gd_3Fe_5O_{12}$; "GdIG") can also be used for at least some applications.

The thickness of magnetic insulator layers 105 can be selected to support an n=1 mode of a standing spin wave having a desired frequency, corresponding to the desired emission frequency of the radiation source. The n=1 mode is then selectively excited by an acoustic pulse that has an appreciable spectral amplitude at that frequency. While the standing spin waves of other odd modes (n=3,5, . . . ) can also produce non-zero net electromagnetic waves via magnetic dipole radiation, the n=1 mode standing spin wave has higher radiation efficiency than higher-order modes. For this reason, the radiation sources are designed such that the injected acoustic pulse has a pulse duration that selectively excites the n=1 mode standing spin wave.

The ability to tailor the emission frequency by engineering the magnetic insulator layer thickness and the acoustic pulse duration makes it possible to design radiation sources that emit radiation across a broad range of frequencies. This approach to engineering the emission frequency based on layer thickness and pulse duration is illustrated in Example 2. Generally, thicker magnetic insulator layers produce emission at lower frequencies, but with a higher peak amplitude of the electric field component ($E_x(t)$). Typical layer thicknesses for the magnetic insulator layers in the superlattice are in the range from 5 nm to 20 nm, and typical pulse durations include those in the range from 5 ps to 60 ps; however, layer thicknesses and pulse durations outside of these ranges can be used.

The superlattice-based radiation sources are engineered such that the electromagnetic radiation waves emitted from the magnetic insulator layers are in-phase and interfere constructively in order to enhance the $E_x(t)$ and the peak output power density. In-phase emission results when the time it takes for the acoustic pulse to travel across bilayer 104 is equal to the period of the selectively excited n=1 mode standing spin waves of magnetic insulator layers 105. Thus, the thickness of dielectric layers 106 is chosen accordingly. This approach to engineering the bilayer thickness to achieve in-phase emission at a selected emission frequency is illustrated in Example 1. The optimal thickness for dielectric layers 106 will depend on the thickness of magnetic insulator layers 105 and on the magnetic insulator and dielectric materials being used. Generally, dielectric layer thicknesses in the range from 15 to 300 nm are suitable. However, layer thicknesses outside of these ranges can be used, depending on the particular materials selected.

Dielectric layers 106 are composed of a non-magnetic, electrically insulating material that does not appreciably absorb the emitted radiation. Moreover, it is desirable for the electrically insulating material to have a good acoustic match with the magnetic insulator, so that the magnitude of the acoustic wave is not substantially reduced as it passes from dielectric layers 106 into magnetic insulator layers 105. Further, the electrically insulating material of dielectric layers 106 should have a sufficiently close lattice match with the magnetic insulator material to allow for epitaxial growth of the magnetic insulator on the dielectric. This enables the epitaxial growth of a superlattice comprising high-quality crystalline layers. Thus, the particular dielectric material used for dielectric layers 106 will depend on the magnetic insulator material. By way of illustration, the non-magnetic electrical insulator $MgAl_2O_4$ (MAO) can be used as the dielectric material for radiation sources that use MAFO as the magnetic insulator. Other suitable dielectric materials include $Gd_3Ga_5O_{12}$ (GGG). The epitaxial growth of the superlattice can be carried out using, for example, molecular beam epitaxy (MBE), pulsed laser deposition (PLD), or magnetron sputtering. Other known methods can be used to form superlattices, including superlattices in which the magnetic insulator and/or dielectric layers are polycrystalline or amorphous, rather than single-crystalline. However, single-crystalline superlattice layers will typically produce the best device performance and, so, are preferred.

The peak amplitude of the emission from the radiation source increases as the number of magnetic insulator layers 105 in the superlattice increases, due to the constructive interference of the output radiation from each such layer. However, in practice, a maximum peak amplitude may be imposed due to an imperfect acoustic match between magnetic insulator layers 105 and dielectric layers 106. The number of magnetic insulator layers in the superlattice is desirably equal to or greater than the number of magnetic insulator layers needed to achieve the maximum achievable peak amplitude for the superlattice, but a lower number of layers can be used. Generally, a superlattice having from 5 to 20 magnetic insulator layers is sufficient to achieve the maximum peak amplitude.

Transducer layer 107 will typically be a metal layer. However, non-metals that can convert incident femtosecond timescale laser pulses into picosecond timescale acoustic pulses can also be used. For the purposes of this disclosure, femtosecond timescale pulses include pulses of tens or hundreds of femtoseconds (i.e., pulses in the range from $10^{-15}$ to $10^{-13}$ seconds), and picosecond timescale pulses include pulses of tens or hundreds of picoseconds (i.e., pulses in the range from $10^{-12}$ to $10^{-10}$ seconds). Metals from which transducer layer 107 can be made include aluminum (Al), Iron (Fe), platinum (Pt), gold (Au), cobalt (Co), and nickel (Ni). Thermal expansion coefficients, electron-phonon coupling coefficients, and electronic specific heat coefficients are properties to consider when choosing materials for use as a transducer layer. Specifically, to generate larger strains, it is better to simultaneously have a large thermal expansion coefficient, a large electron-phonon coupling coefficient, and a small electronic specific heat coefficient. Transducer layer 107 should have a thickness that is at least as large as the absorption depth of the laser pulses in the transducer layer in order to prevent the laser radiation from reaching thermally insulating layer 108 and/or the superlattice 102. However, excess thickness is generally not desirable because a thinner transducer layer provides a larger temperature gradient across the interface between the transducer layer and the thermal insulation layer. This is advantageous because it leads to the injection of larger elastic strains into the magnetic insulator layer, which results in electromagnetic radiation emission with a higher amplitude. The optimal thickness of the transducer layer will depend on the particular transducer material being used and the required magnitude of the output signal. However, by way of illustration, layer thicknesses in the range from about 10 nm to about 100 nm, including thicknesses in the range from about 20 nm to 50 nm, are suitable. The transducer layer may be single-crystalline, polycrystalline, or amorphous, and can be formed on the surface of the substrate using known deposition methods, such as magnetron sputtering or electron beam (e-beam) evaporation followed by an anneal.

Thermal insulation layer 108 is an optional layer that provides thermal insulation between transducer layer 107 and the first layer of the superlattice (for example, the first magnetic insulator layer 105 of superlattice 102 in the illustrative embodiments of FIGS. 1A and 1B). If present, the thermal insulation layer 108 is desirably transparent to the emitted radiation and is desirably thick enough to shield the superlattice from most or all of the heat deposited into the heterostructure by the laser pulses. Since the transducer 107 may reflect the radiation emitted from the magnetic insulator layers, the thickness of the thermal insulation layer 108 should not be close to or equal to $n\lambda/2$, where $n=1, 2, 3 \ldots$ is an integer number and A is the wavelength of the emitted radiation. This would ensure the radiation reflected by the transducer 107 does not interference destructively with the radiation originally emitted from the magnetic insulator layers 105. Rather, the thermal insulation layer 108 should desirably have a thickness that is equal to or close to $n_{odd}\lambda/4$, where $n_{odd}=1, 3, 5, \ldots$ is odd integer number and A is the wavelength of the emitted radiation. This would ensure the radiation reflected by the transducer 107 interference constructively with the radiation originally emitted from the magnetic insulator layers 105. By way of illustration, thermal insulator layer thicknesses in the range from about 300 nm to about 500 µm are typically suitable; however, thicknesses outside of this range can be used. Ideally, suitable materials for use as the thermal insulation layer should simultaneously have low thermal conductivity (for better shielding from the heat), have a lower thermal expansion coefficient than the transducer (for obtaining larger strains), be electronically insulating (for obtaining larger strains), and have a good acoustic match with the magnetic insulator layer (which usually means high speed of sound), such that the acoustic wave would not become smaller in magnitude after entering the magnetic insulator layer.

A femtosecond laser is optically coupled to light-receiving surface 112 of transducer layer 107. As used herein, the term optically coupled is used to mean that the femtosecond laser is positioned to direct a beam of femtosecond laser pulses 110 onto light-receiving surface 112, either directly or indirectly using, for example, reflective surfaces or other optical components to steer the beam from the laser to the light-receiving surface. Pulsed femtosecond (fs) lasers are known and commercially available. Such lasers generate a pulsed laser output at a frequency in the range from $10^{-15}$ to $10^{-13}$ seconds. As discussed above, the optimal acoustic pulse duration and, therefore, the optimal laser pulse duration, will depend on the particular materials and layer thicknesses of the superlattice. By way of illustration, fs pulses having a duration in the range from 10 fs to 30 fs may be used. However, fs pulses with durations outside of this range can also be used.

A plurality of acoustically mediated radiation sources can be incorporated into a phased array in which the collective emission from the radiation sources generates an output beam of electromagnetic radiation, the direction of which is electrically steerable.

It should be noted that, while the radiation sources used in the phased array can be the acoustically mediated, superlattice based radiation sources, acoustically mediated radiation sources that include only a single magnetic layer for emission, rather than a superlattice structure, can also be used. Examples of single magnetic layer, acoustically mediated radiation sources are described in Example 2 and in Zhuang, Shihao, et al. *ACS Applied Materials & Interfaces* 13, 48997-49006 (2024 As illustrated schematically in FIG. 2, these radiation sources 200 are based on a multilayered heterostructure that includes a light-to-acoustic transducer layer 207, a thermal insulation layer 208, a magnetic layer 205, and, optionally, a dielectric substrate 214.

Like the superlattice-based radiation emitters, the single magnetic layer radiation emitters generate electromagnetic waves through magnetic dipole radiation. Although the inventors do not intend to be bound to any particular theory, the principles of operation of the single magnetic layer-based radiation sources are similar in some respects to those of the superlattice-based radiation sources. However, the single magnetic layer sources do not rely on the constructive interference of the emitted electromagnetic waves from multiple magnetic layers. The mechanism can be summarized as follows: layer 207 acts as a light-to-acoustic transducer to convert fs timescale laser pulses incident upon its outermost surface, which is referred to herein as a light-receiving surface, into fast (e.g., ps timescale) acoustic pulses that are injected into magnetic layer 205, giving rise to a strain wave (also referred to as an acoustic wave) in magnetic layer 205. This strain wave excites spin waves in magnetic layer 205 through magnetoelastic coupling and short-range exchange coupling. Strong interactions between the spin waves and the strain wave produce high frequency exchange spin waves propagating in magnetic layer 205. High frequency exchange spin waves incident upon the far surface of magnetic layer 205 are reflected, and the incident and reflected exchange spin waves produce a high-frequency standing spin wave, which leads to the emission of electromagnetic waves through magnetic dipole radiation.

The materials and layer thicknesses for the light-to-acoustic transducer layer, the thermal insulator layer, and the dielectric substrate in the non-superlattice radiation sources may be the same as those for the corresponding layers in the superlattice-based radiation sources. However, the magnetic layer in the non-superlattice-based radiation sources need not be composed of an electrical insulator and, therefore, magnetic metals and metal alloys having strong magnetoelastic coupling can be used, as well as magnetic insulators. Suitable materials for magnetic layer 205 include an Fe metal, an FeGa alloy, a CoFeB alloy, a CoFe alloy, MgO, and GGG. Magnetic insulators, such as MAFO, YIG, and GdIG, can also be used. If magnetic layer 205 is grown epitaxially on thermal insulating layer 208 or dielectric substrate 214, those layers can be selected to promote epitaxial growth.

Typical thickness of magnetic layer 205 is in the range from 5 nm to 20 nm for emitting electromagnetic radiation with a frequency of 30-300 GHz. However, the optimal thickness will depend on the particular magnetic material being used because the frequency of the emitted radiation depends on the magnetic parameters and the thickness of the magnetic layer 205.

Figure 2:
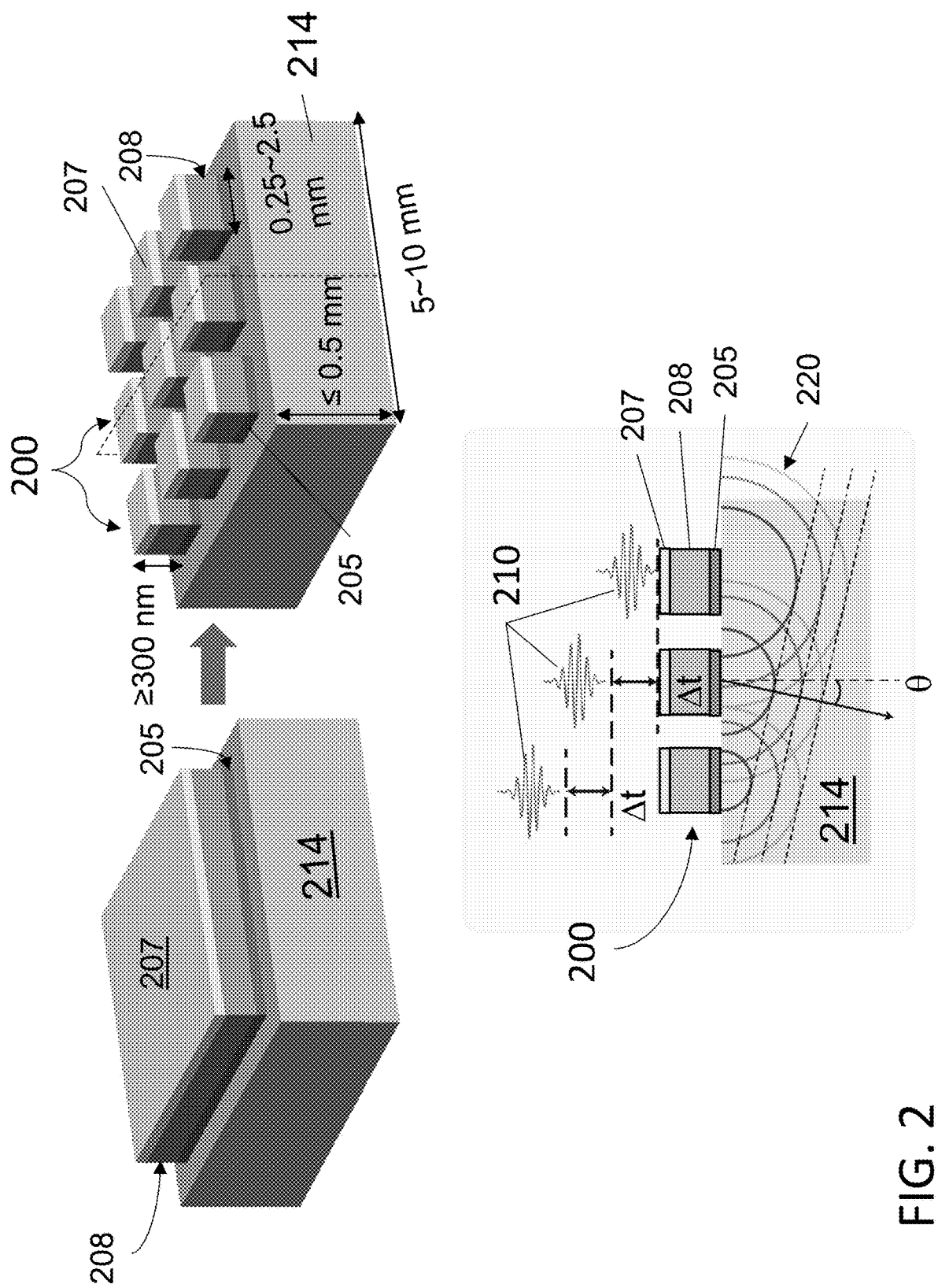
FIG. 2 is a schematic diagram shown a perspective view (upper right panel) and a cross-sectional view (lower panel) of a phased array based on acoustically mediated electromagnetic radiation sources. The phased array can be formed from a corresponding multilayered heterostructures (upper left panel).

A schematic illustration of a phased array that includes a plurality of (in this case, nine) radiation sources is shown in FIG. 2. The radiation sources may be superlattice-based or single magnetic layer-based sources of the types described herein. A perspective view of the phased array that includes nine radiation sources is shown in the upper right panel and a cross-sectional view of the phased array is shown in the lower panel. The upper left panel of FIG. 2 shows the original heterostructure from which the array of radiation sources can be formed lithographically. Although the radiation sources depicted in FIG. 2 include only a single layer of magnetic material 205, superlattice-based radiation emitters of the type illustrated in FIGS. 1A and 1B can also be used. In the illustrative example of FIG. 2, radiation sources 200 share a common dielectric substrate 214. Illustrative width and height dimensions for the array of radiation sources, including the dimensions of the radiation sources themselves, as well as the spacing between neighboring radiation source, are provided in the figure. However, arrays of radiation sources having dimensions and spacings different from those shown in the figure can be used depending on the frequency of the radiation, the desirable steering angle, angular resolution, and output power. For purposes of illustration only, typical dimensions for both the lateral dimensions and the spacing between neighboring radiation source are set to be ¼th of the wavelength of the emitted radiation, which would be 0.75 mm for a 100-GHz radiation (with a 3 mm wavelength). As illustrated in FIG. 2, arrays of radiation sources having a small footprint (e.g., lateral dimensions in the range from 0.1 mm to 10 mm or smaller; where the lateral dimensions are orthogonal to the length axis of the radiation source) can be fabricated using the radiation source design described herein, and such small arrays are useful for a variety of applications. Such miniature-sized patterned arrays can be conveniently fabricated from a corresponding continuous-film-based multilayer stack (for example, the structure shown in the upper left panel of FIG. 2) via standard microfabrication techniques such as electron beam lithography or the use of shadow masks during thin-film deposition.

The phased arrays use a plurality of individual radiation sources 200 that are separately triggered by femtosecond pulsed laser beams 210 to cumulatively produce an output electromagnetic wave that is highly directional. Time delays ($\Delta t$) are introduced in the different pulsed laser beams (FIG. 2, lower panel), such that the electromagnetic waves 220 emitted from individual radiation sources 200 constructively interfere in a given direction and destructively interfere in other directions. The direction of the resulting output beam wavefront can be controlled by adjusting the time delays between the pulsed laser beams 210. Each radiation source 200 may be triggered by an associated femtosecond pulsed laser that is optically coupled to the radiation source's light-to-acoustic transducer layer. However, it is not necessary for each radiation source 200 to have a dedicated laser. Instead, the pulsed beam from a laser could be spilt into multiple sub-beams for actuating the radiation sources. The phased array may further include a time-delay control system, such as a time-delay circuit, that controls the timing of each pulsed laser 210 to sequentially actuate the pulsed lasers. The number of radiation sources and their spatial arrangement in the phased array may be chosen to provide the desired constructive and destructive interference and output beam directionality range. Typical geometric patterns in which the radiation sources can be arranged include, but are not limited to, rows and columns, including more specifically, grid arrays of different symmetry (for example, hexagonal, square) in the film plane. The shape of the individual radiation source can include, but are not limited to, cuboid and circular disk.

EXAMPLES

Example 1: Illustrative Example of an Acoustically-Mediated Superlattice-Based Radiation Source This example computationally demonstrates a mmW pulsed emitter based on acoustically mediated optically induced excitation of spin waves in a magnetoelastic superlattice heterostructure. The peak output power of such a magnonic mmW emitter can maintain the same order of magnitude over the entire frequency span of 30-300 GHz, not subjected to the $1/f^2$ scaling. The emitter is based on a magnetoelastic superlattice, which integrates repetitive stacks of the low-damping magnetic insulator $MgAl_{0.5}Fe_{1.5}O_4$ (MAFO) and a non-magnetic insulator $MgAl_2O_4$ (MAO). The computations demonstrate that the emitter can deliver a peak output power of about $10^6$ times higher than that of the IMPATT diodes over the entire mmW band. This magnonic mmW pulsed emitter therefore represents a fundamentally new solution to the generation of the much-needed high-power mmW pulses especially at a high-frequency (100-300 GHz) regime.

Figure 3:
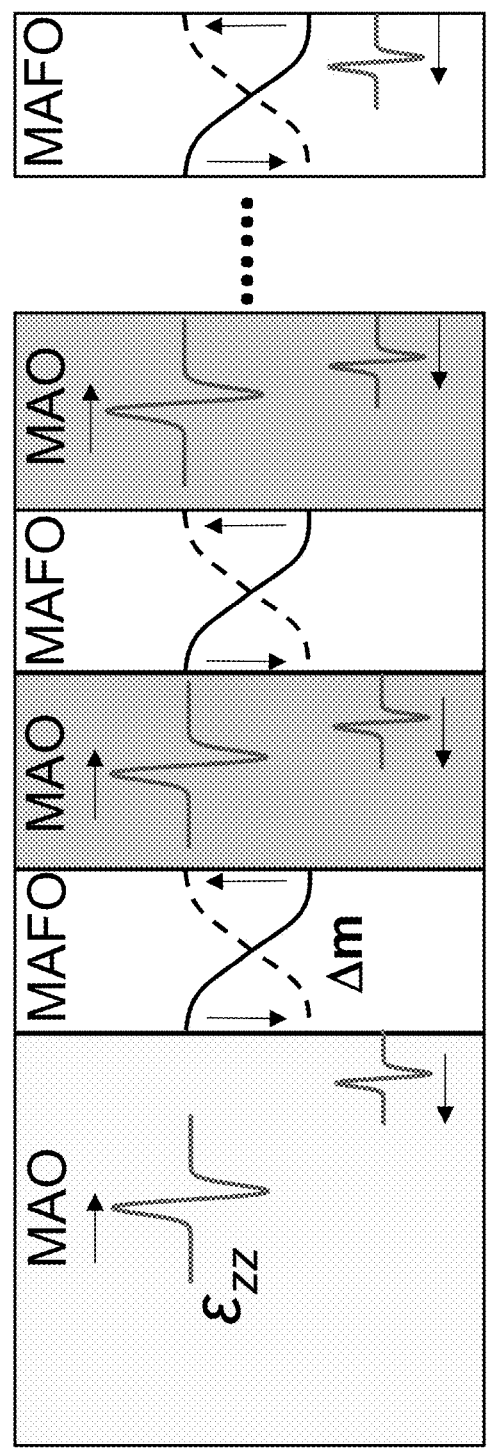
FIG. 3 shows an acoustic pulse traversing a series of MAFO layers in a superlattice formed from MAFO/MAO bilayers. As shown in the figure, a portion of the acoustic pulse is reflected at the MAFO/MAO interfaces and the acoustic pulse excites an n=1 mode standing spin wave in each MAFO layer.

The structure of the superlattice heterostructure based on MAFO is shown in FIG. 3. As seen, a MAFO/MAO bilayer was used as a repetitive unit and was repeated along the thickness direction (L) of the superlattice. The superlattice was deposited on an MAO substrate (the leftmost MAO layer in FIG. 3), into which a strain pulse was injected by exciting an Al metal transducer (not shown) present on the opposite side of the MAO substrate. The rightmost layer in the superlattice was an MAFO thin film, as shown in FIG. 3, and the superlattice could also terminate in an MAO thin film. The superlattice shown in FIG. 3 included 7 MAFO layers with thicknesses of 10 nm and 6 MAO layers with thicknesses of 51.4 nm. The acoustic pulse had a duration of 12.6 ps and a peak amplitude of 0.3% in MAO layers. (More information with respect to the selection of appropriate magnetic insulator layer thicknesses and acoustic pulse durations is provided in Example 2.)

When the strain pulse traveled across the MAO/$(MAFO)_7$/$(MAO)_6$ structure (subscripts m and n refer to the number of layers), standing spin waves (SSWs) in each MAFO layer were excited in order. When the time for the strain pulse to travel across one repetitive unit (MAFO/MAO bilayer) was exactly the period of the SSW of mode n=1, the excited SSWs of mode n=1 in each MAFO layer, and hence their emitted electromagnetic waves, were in phase. The frequency of the n=1 mode SSW, and hence the emitted radiation, was determined by the thickness and materials parameters of the magnetic insulator layer MAFO. Therefore, the thickness of the MAFO needed to be selected based on the desired frequency of the emitted radiation. For example, in FIG. 4, a 10-nm-thick (001) MAFO layer thickness gave rise to a frequency of 130 GHz. Once the thickness of the MAFO layers is fixed, in order to obtain in-phase SSW in all MAFO layers, the thickness of the MAO layers needs to be selected accordingly. Specifically, the desirable thickness of the MAO layer ($d_{MAO}$) can be calculated as $d_{MAO}=v_{MAO}[(1/f_{n=1}*)-(d_{MAFO}/v_{MAFO})]$, where $d_{MAFo}$ is the thickness of each MAFO layer, and $v_{MAO}$ and $v_{MAFO}$ are sound speeds in MAO and MAFO, respectively. Ideally, the peak amplitude of the emitted radiation, represented by $E_x^{peak}$, would increase linearly as the number of MAFO layer increase, because the electromagnetic waves emitted from each MAFO layer were in phase and interfered constructively.

Figure 4:
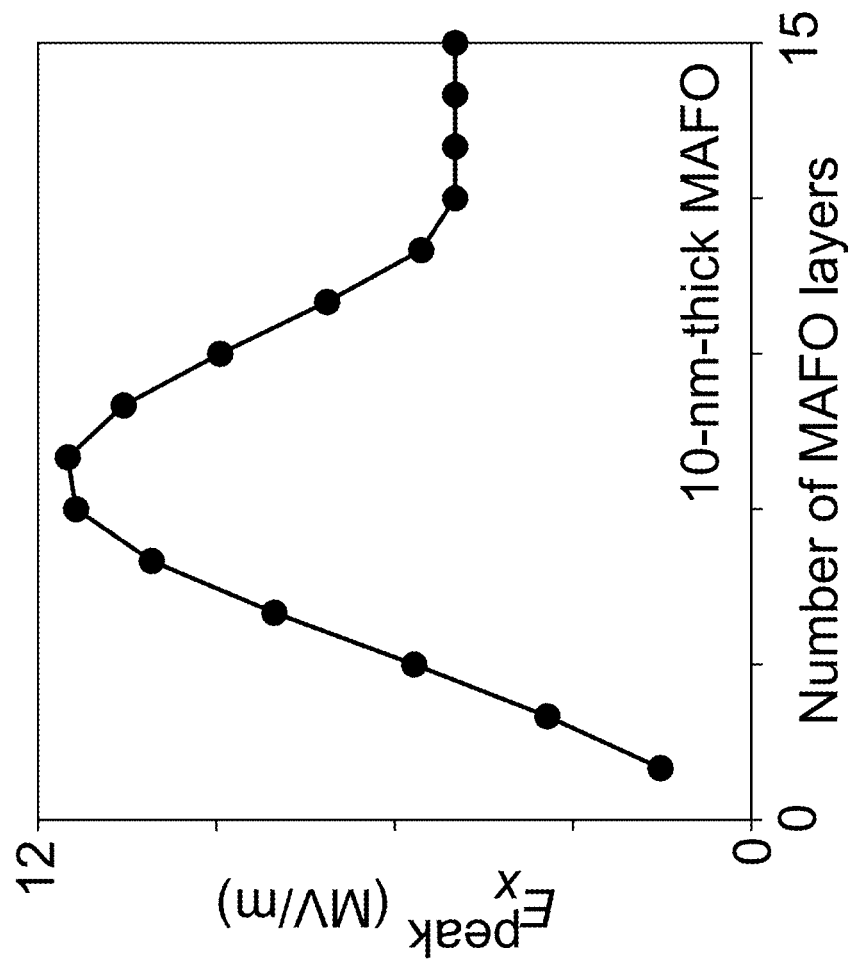
FIG. 4 shows that the peak amplitude of the electric field component, $E_x(t)$, of the electromagnetic emission from an acoustically mediated, superlattice-based radiation source reaches maximum at 7 MAFO layers and saturates at 12 MAFO layers.

However, the partial reflection of the injected strain pulse at the MAO/MAFO interfaces, as shown in FIG. 3, will complicate and eventually impede the desirable in-phase construction. As a result, there exists an optimum number of MAFO layers that yields the maximum peak amplitude of the radiation. As shown in FIG. 4, as the number of MAFO layers increased, the $E_x^{peak}$ increased as at first and reached a maximum at 7 MAFO layers. After that it decreased and eventually saturated when there were more than 12 MAFO layers. Specifically, when the strain pulses reflected at the MAO/MAFO or MAFO/MAO interfaces return to the MAFO layers, they will perturb the SSW in these MAFO layers excited by the originally injected strain pulses, which could shift the phases of these SSWs. As the number of MAFO layers increases, more interfaces will be created. The accumulation of the phase shift caused by multiple reflected strain pulses, which could reduce the $E_x^{peak}$, would eventually outweigh the gain in the $E_x^{peak}$ from the in-phase construction induced by the originally injected strain pulse. The details of the nature of such competition will vary with the thickness and material parameters of each individual layer, as well as the amplitude and duration of the injected strain pulse.

Figure 5:
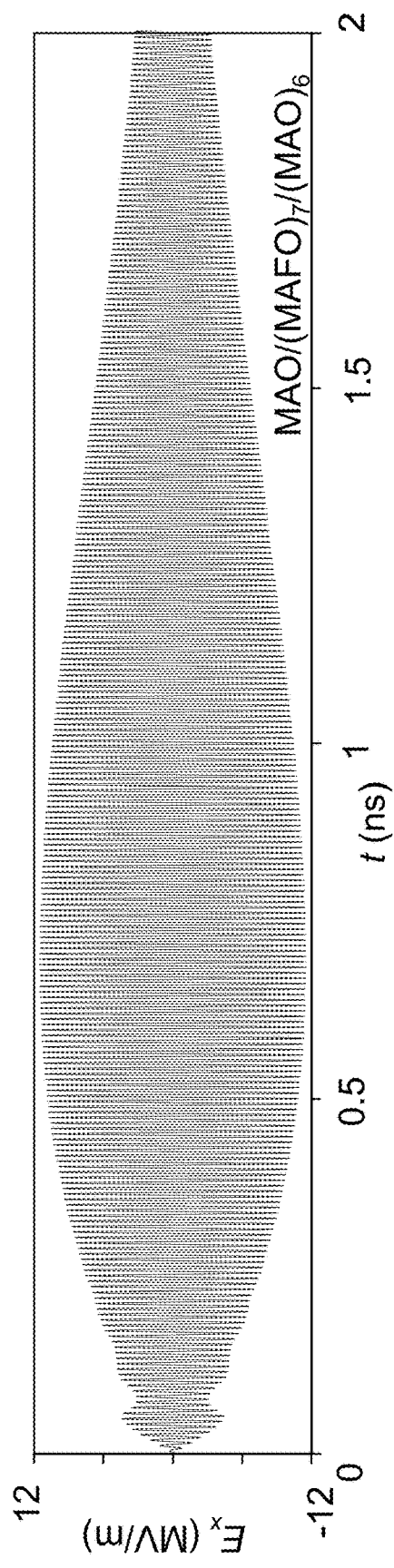
FIG. 5 shows the temporal profile of $E_x(t)$ from the AUMAO(substrate)/(MAFO)$_7$/(MAO)$_6$ superlattice of Example 1.
Figure 6:
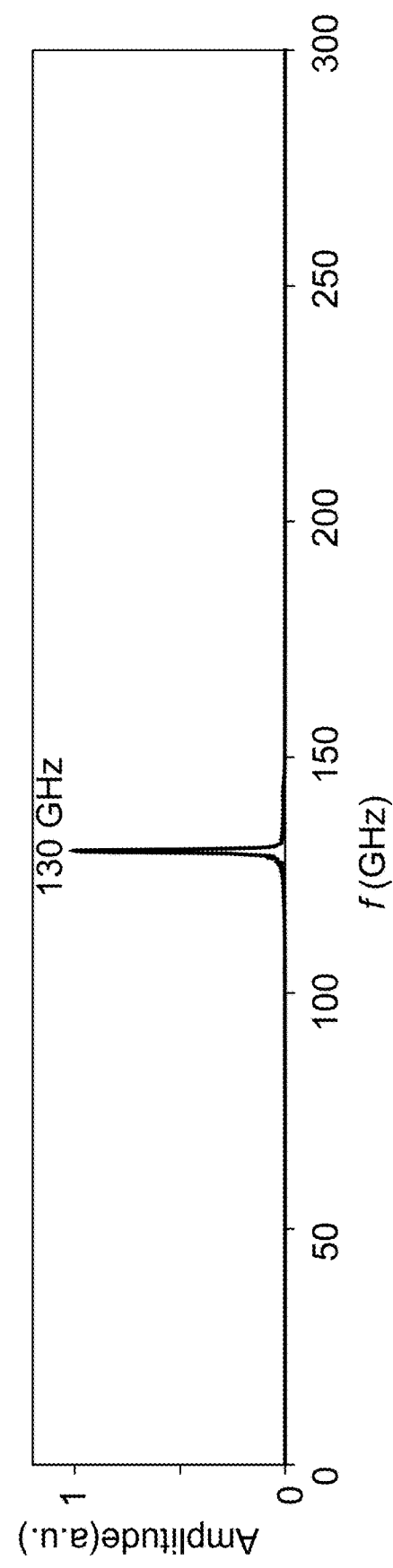
FIG. 6 shows a single peak at frequency of 130 GHz in the frequency spectrum of the $E_x(t)$ from the Al/MAO(substrate)/(MAFO)$_7$/(MAO)$_6$ superlattice of Example 1.

The temporal profile of $E_x(t)$ from the MAO/$(MAFO)_7$/$(MAO)_6$ structure is shown in FIG. 5. As seen, after the major portion of the strain pulse left the superlattice at t~100 ps, the amplitude of the $E_x(t)$ continued to increase for ~600 ps due to the increasing amplitude of the SSWs. After that, the amplitude of the $E_x(t)$ monotonically decreased due to magnetic damping. The frequency spectrum of the $E_x(t)$ shown in FIG. 6 presents a single peak of 130 GHz, corresponding to the frequency of the SSW of mode n=1.

Figure 7:
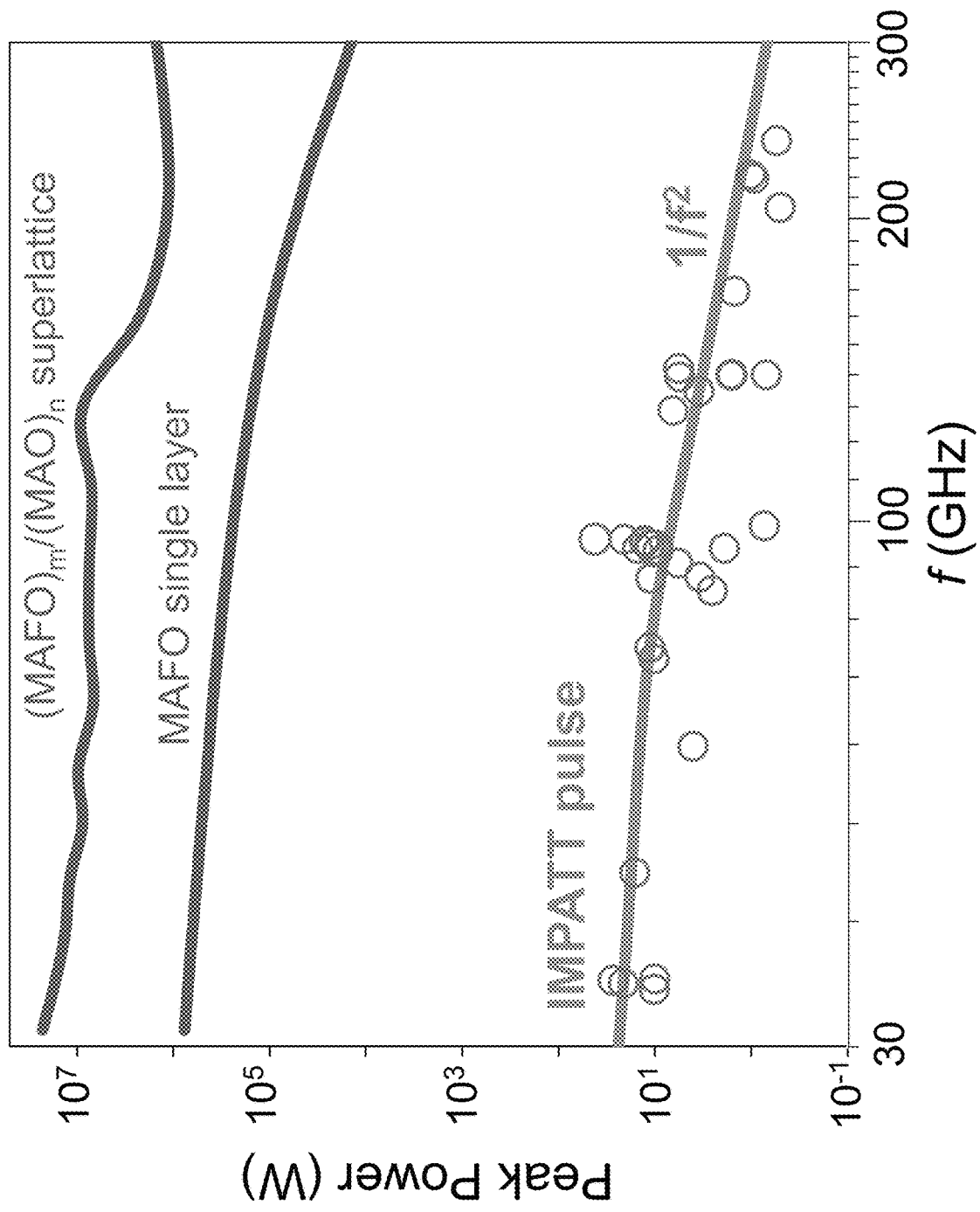
FIG. 7 shows the peak output power as a function of frequency for an MAFO superlattice-based radiation emitter and a single MAFO layer-based radiation emitter, compared with the peak output power of an IMPATT (IMPact ionization Avalanche Transit-Time) diode.

FIG. 7 shows the maximum peak output power from the MAFO/MAO superlattice-based magnonic mmW emitters as a function of peak frequency, where the peak power density is calculated as $|E_x^{peak}|^2/\eta$ and $\eta=377\Omega$ is free space impedance and the emission area is assumed to be 5 mm×5 mm (the lateral size of the MAFO layers). For comparison, the peak power density for a magnonic emitter based on a single MAFO layer is also shown. As seen, the MAFO/MAO superlattice-based emitter enhanced the peak output power by 10-60 times compared to the single-layer MAFO-based emitter. Moreover, the peak output power from the MAFO/MAO superlattice-based emitter is in the order of $10^6$ W, which is $10^5$ to $10^6$ larger than that that from a IMPATT diode. Furthermore, the MAFO/MAO superlattice-based magnonic emitters maintained the same order of magnitude of output power over the entire mmW band, and the output power does not decrease with increasing frequency in the range of about 200-300 GHz.

Example 2: Illustrative Guidance for the Selection of Magnetic Insulator Layer Thickness and Acoustic Pulse Duration This example illustrates the selection of an appropriate magnetic insulator layer thickness and acoustic pulse duration for an acoustically mediated, superlattice-based radiation source. Radiation sources that include only a single magnetic conductor layer (e.g., a metal; FeGa) or only a single magnetic insulator layer (e.g., MAFO) were used as proof of principle.

FIG. 8A shows the design of a magnonic mmW pulsed emitter based on a metal/dielectric/magnetoelastic heterostructure, using an Al/MAO/MAFO heterostructure as an illustrative example. The Al film converts an incident fs laser pulse into a ps acoustic pulse via thermal expansion. The injection of this ultrashort acoustic pulse into the MAO and MAFO layers was modelled by applying a time-dependent mechanical displacement at the Al/MAO interface (z=0) in the form of Gaussian function, $u_z(z=0, t)=u_{max}\exp(-t^2/\sigma^2)$, which leads to a bipolar longitudinal strain $\varepsilon^{zz}=\partial u_z/\partial_z$ propagating in the MAO substrate and then the MAFO film. A bipolar Gaussian-shaped strain pulse can excite standing spin waves (SSW) confined along the thickness direction of a single magnetoelastic film, with wavenumber k=nπ/d (n=1, 2, 3 . . . ) where d is the film thickness. (Azovtsev, A. V & Pertsev, N. A. *Phys. Rev. Mater.* 4, 64418 (2020).) This example demonstrates that such SSW can emit a high-power mmW electromagnetic pulse via magnetic dipole radiation under appropriate pulse duration τ and film thickness d.

Figure 8D:
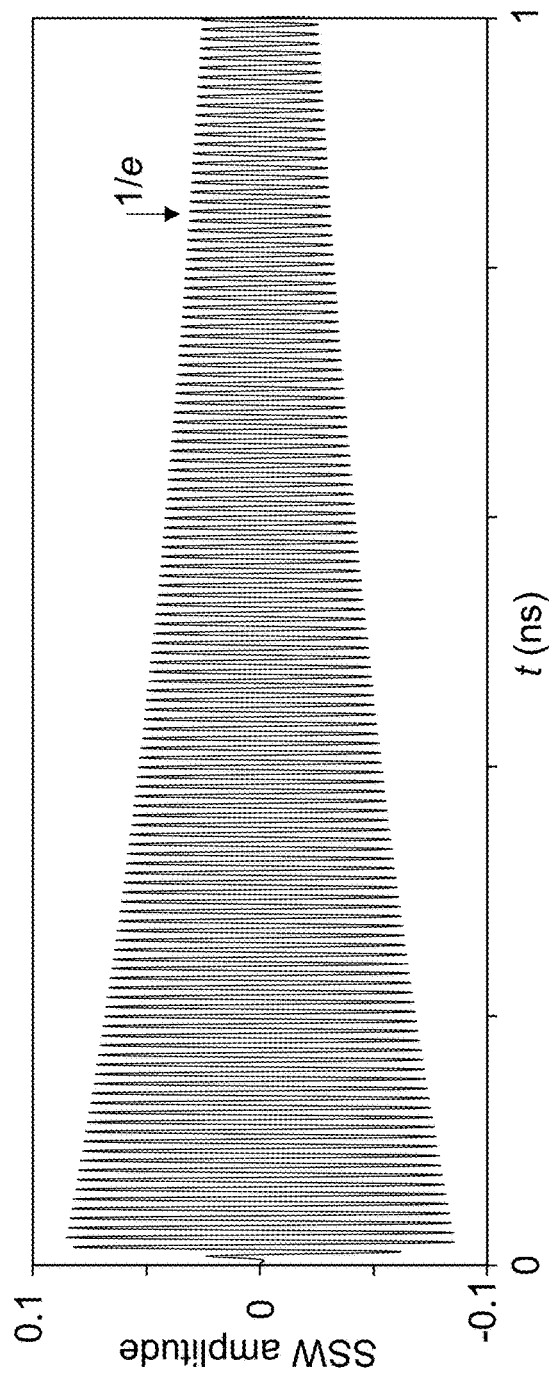
FIG. 8D shows the temporal evolution of the amplitude of a standing spin wave in the magnonic mmW pulsed emitter of FIG. 8A.
Figure 8E:
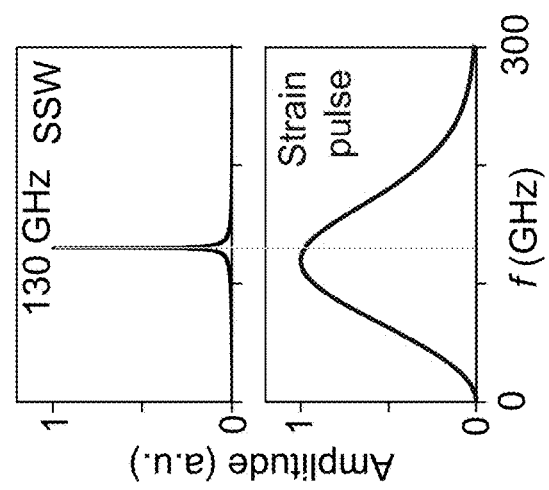
FIG. 8E (top panel) shows the corresponding frequency spectrum for the standing spin wave in the magnonic mmW pulsed emitter with a single peak at frequency f=130 GHz.
Figure 8F:
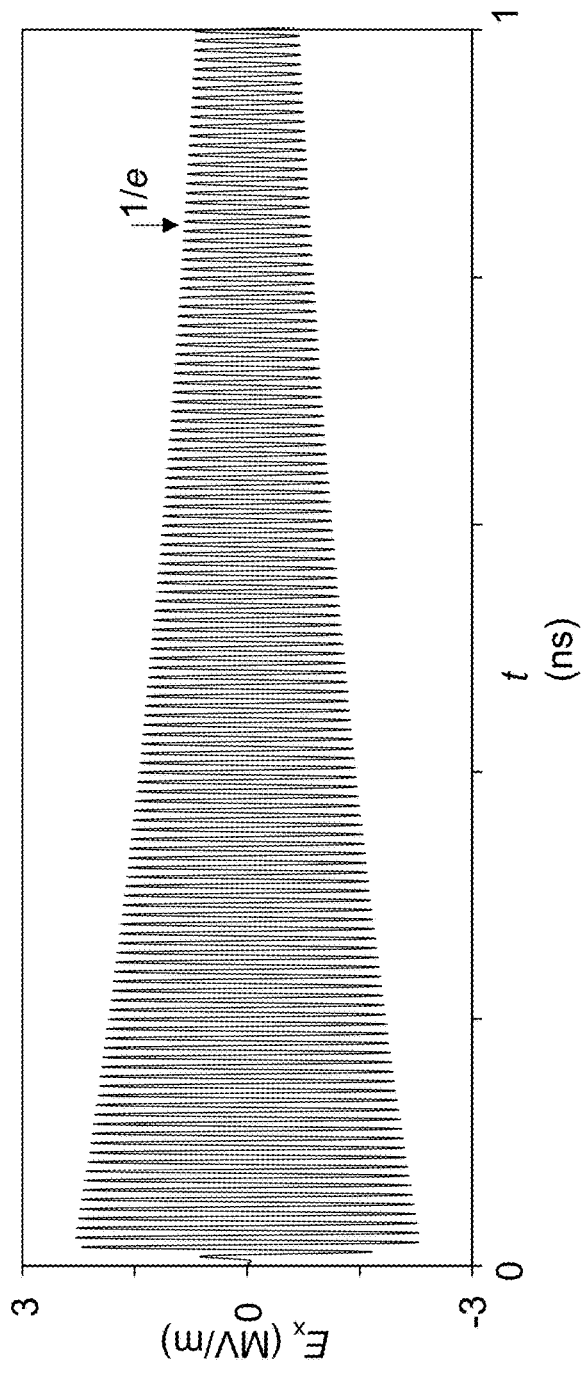
FIG. 8F shows the temporal evolution of the electric-field component $E_x(t)$ of the emitted electromagnetic wave in the free space above the MAFO film surface of the magnonic mmW pulsed emitter of FIG. 8A.
Figure 8G:
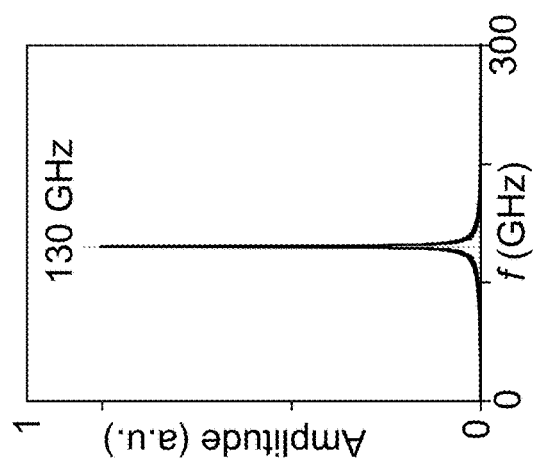
FIG. 8G shows the frequency spectrum of the $E_x(t)$ data in FIG. 8F.

FIG. 8B shows the spatiotemporal profile of the strain pulse $\varepsilon_{zz}(z,t)$ in a 10-nm-thick MAFO film. The strain pulse had a duration τ=12.6 ps and peak amplitude $\varepsilon_{max}$ 0.3% in MAO substrate. As seen, the strain pulse propagated into the MAFO film from its front surface (z=0 nm) at t=0 ps and exited at t≈$2t_0$+τ=16.6 ps; $t_0$=d/$v_s$ is the time for the strain pulse to travel across the MAFO film, where d is the MAFO thickness and $v_s$=5240.5 m/s is the longitudinal sound velocity in MAFO. The spatiotemporal profile of the excited spin wave within t=0-33.2 ps is shown in FIG. 8C. Within the first 16.6 ps (the lifetime of the strain pulse in the MAFO film), the strain pulse enabled the formation of non-uniform magnetization distribution via magnetoelastic coupling, creating a spin wave that propagated together with the strain pulse along the z axis. The formation of the SSW started at t≈$t_0$=1.9 ps, which was also the moment the excited spin wave started to be reflected from the stress-free MAFO back surface. The SSW formed due to the interference between the incident and reflected spin waves. The SSW formation completed at t≈$2t_0+\tau$=16.6 ps, which was also the moment the strain pulse left the MAFO. FIG. 8D shows the temporal evolution of the SSW amplitude, which was approximated by the difference in the $m_y$ values at the front and back film surfaces, i.e., $m_y(z=d)-m_y(z=0)$. As seen, the SSW amplitude peaked near t=16.6 ps, and then gradually decreased due to magnetic damping. The corresponding frequency spectrum (the top panel of FIG. 8E) shows a single peak at frequency f=130 GHz, which is the same as that for the MAO/MAFO superlattice radiation source with 10-nm-thick MAFO. To excite SSW of a specific frequency mode (e.g., the frequency at n=1), the frequency spectrum of the strain pulse should have an appreciable spectral amplitude at the same frequency f, and the SSW amplitude in time-domain was found to be proportional to the spectral amplitude of the driving strain pulse at that particular frequency. For the illustrative case of 10-nm-thick MAFO film excited by a strain pulse with z=12.6 ps herein, only the n=1 mode SSW with a frequency of 130 GHz can be excited. This is because the spectral amplitude of the strain pulse was only appreciable at below 300 GHz, as shown in the bottom panel of FIG. 8E, while the frequencies of the higher-order SSW all exceeded 300 GHz, e.g., 525.1 GHz for n=2 mode, 1183.5 GHz for n=3 mode, and so forth. FIG. 8F shows the temporal evolution of the electric-field component $E_x(t)$ of the emitted electromagnetic wave in the free space above the MAFO film surface, which had the same profile as the excited n=1 mode SSW (c.f. FIG. 8D) and for the frequency spectrum (FIG. 8G). Specifically, the amplitudes of both the SSW and $E_x(t)$ decreased to 1/e of their peak amplitudes at ~837 ps.

Figure 9A:
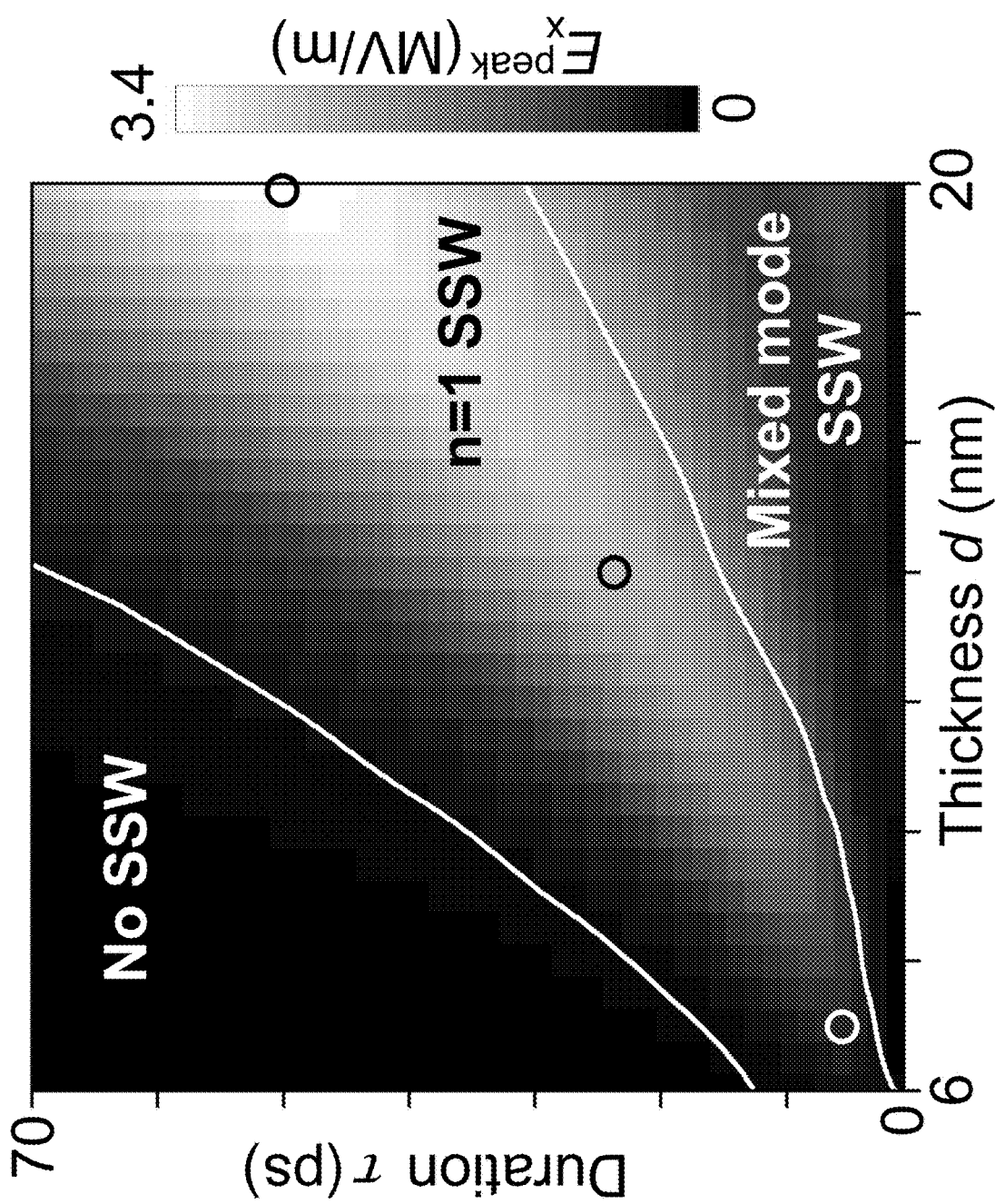
FIG. 9A shows the peak amplitude of the emitted $E_x(t)$ of a magnonic mmW pulsed emitter having the design shown in FIG. 8A, as a function of the MAFO film thickness d and the duration of the injected strain pulse τ.

FIG. 9A shows the peak amplitude of the emitted $E_x(t)$ as a function of the MAFO film thickness d and the duration of the injected strain pulse z, where a variation of d from 6 nm to 20 nm enabled covering the majority of the mmW band from 365 GHz to 30 GHz for the radiation. The maximum peak amplitude of the $E_x(t)$ always appeared when a selective excitation of the n=1 mode SSW was achieved. To do that, the pulse duration needed to be in an intermediate range. If the duration was too long, the n=1 mode SSW or higher-order (n>1) modes could not be excited (see the 'No SSW' region) because the frequency range of the strain pulse would remain below the SSW frequency. Instead, there would only be lower-frequency spin waves that travel together with the strain pulse, which barely emits electromagnetic waves. If the duration was too short, the frequency range of the strain pulse would encompass the frequencies of both the n=1 mode and the higher-order modes, and therefore would excite SSW of more than one mode.

Figure 9B:
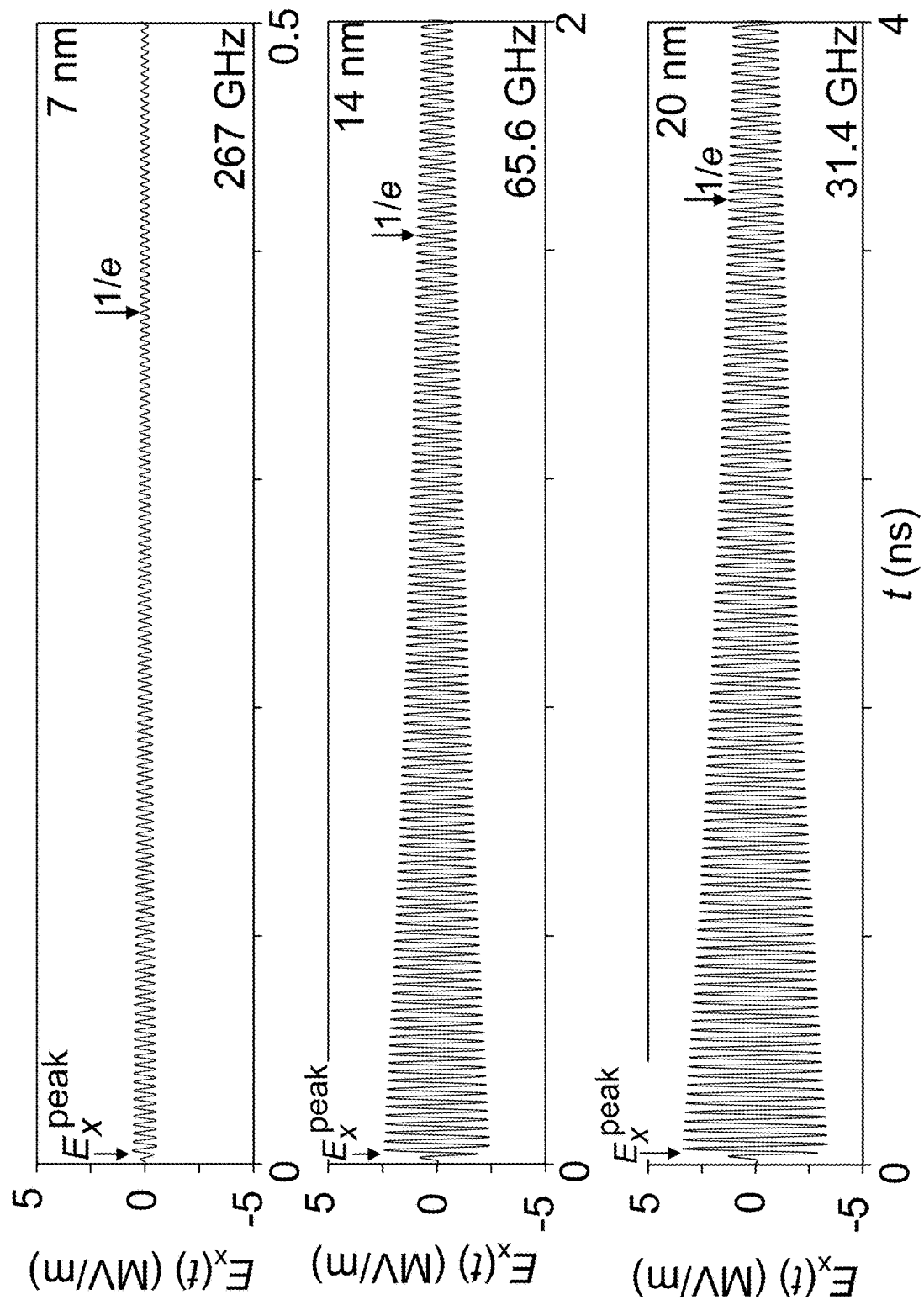
FIG. 9B shows the temporal profiles of the emitted $E_x(t)$ from magnonic mmW pulsed emitters having 7-nm-thick, 14-nm-thick, and 20-nm-thick MAFO films under strain pulses of the same amplitude but different durations.

FIG. 9B shows the temporal profiles of the emitted $E_x(t)$ from 7-nm-thick, 14-nm-thick, and 20-nm-thick MAFO films under strain pulses of the same amplitude ($\varepsilon$max 0.3% in MAFO) but different durations z=5.6 ps, 23.8 ps, 50.4 ps, respectively, which are the optimal duration z for maximizing the peak amplitude of $E_x(t)$. It can be seen that the $E_x(t)$ emitted from thicker MAFO films had a higher peak amplitude $E_x^{peak}$ and longer duration (indicated by the '1/e' label) but lower frequency. The inverse frequency-thickness relation arose due to the fact that the wavenumber of the n=1 mode SSW in the MAFO film followed the k=π/d relation. Moreover, since the damping coefficient of the MAFO is assumed to be independent of film thickness for simplicity, the perturbed local magnetization vectors would undergo the same number of cycles of damped precession back to equilibrium. In this case, the lower-frequency SSW (and hence the emission) lasted longer because they have longer duration per cycle. Furthermore, the $E_x^{peak}$ was larger in thicker films because the injection of longer-duration strain pulse leads to larger-amplitude SSW due to the more sufficient interaction between local strain and local magnetization. As shown in FIG. 9C, the peak SSW amplitude, $m_y(z=d)-m_y(z=0)$, was about six times larger in the 20-nm-thick MAFO than the one in the 7-nm-thick MAFO.

Methods

An in-house fully coupled Multiphysics model that considers the coupled dynamics of elastic waves, spin waves, and electromagnetic wave emission was used to simulate the spatiotemporal profiles of the local mechanical displacement, local magnetization, and EM wave. In this model, the evolution of local mechanical displacement u is described by elastodynamic equation incorporating the magnetostrictive stress, given by, $$\rho \frac{\partial^2 u_x}{\partial t^2} = c_{44} \frac{\partial^2 u_x}{\partial z^2} + B_2 \frac{\partial (m_x m_z)}{\partial z}, \quad (1)$$

$$\rho \frac{\partial^2 u_y}{\partial t^2} = c_{44} \frac{\partial^2 u_y}{\partial z^2} + B_2 \frac{\partial (m_y m_z)}{\partial z}, \quad (2)$$

$$\rho \frac{\partial^2 u_z}{\partial t^2} = c_{11} \frac{\partial^2 u_z}{\partial z^2} + B_1 \frac{\partial (m_z^2)}{\partial z}, \quad (3)$$

where $\rho$ is the mass density; $c_{11}$, $c_{12}$ and $c_{44}$ are the elastic stiffness coefficients. $\rho$ and c are different in different layers of the metal/dielectric/magnetoelastic heterostructure. $B_1 = -1.5\lambda_{100}(c_{11}^M - c_{12}^M)$ and $B_2 = -3\lambda_{111}c_{44}^M$ are the magnetoelastic coupling coefficients of the magnetoelastic film ($\lambda_{100}$ and $\lambda_{111}$ are its magnetostrictive coefficients); m=M/$M_s$ is the normalized local magnetization vector. The evolution of local magnetization m(z,t) is governed by the Landau-Lifshitz-Gilbert (LLG) equation, $$\frac{\partial m}{\partial t} = -\frac{\gamma}{1+\alpha^2} m \times H_{eff} - \frac{\alpha\gamma}{1+\alpha^2} m \times (m \times H_{eff}). \quad (4)$$

The total effective magnetic field $H_{eff}$ is contributed by the magnetocrystalline anisotropy field $H^{anis}$ magnetic exchange coupling field $$H^{exch} = \frac{2A_{ex}}{\mu_0 M_s} \nabla^2 m,$$

magnetoelastic anisotropy field $H^{mel}$, magnetic dipolar coupling field $H^{dip}$, the external magnetic field $H^{ext}$, and the magnetic field component of the emitted electromagnetic wave $H^{emw}$. For magnetic materials with a cubic high-temperature parent phase, one has (i=x, y, z, and j≠i, k≠i, j), $$H_i^{anis} = -\frac{2}{\mu_0 M_s} [K_1(m_j^2 + m_k^2) + K_2 m_j^2 m_k^2] m_i, \quad (5)$$

$$H_i^{mel} = -\frac{2}{\mu_0 M_s} [B_1 m_i \varepsilon_{ii} + B_2(m_j \varepsilon_{ij} + m_k \varepsilon_{ik})], \quad (6)$$

where $\mu_0$ is vacuum permeability; $K_1$ and $K_2$ are magnetocrystalline anisotropy coefficients; strain $$\varepsilon_{ij} = \frac{1}{2}\left(\frac{\partial u_i}{\partial_j} + \frac{\partial u_j}{\partial i}\right). \quad (5)$$

A bias magnetic field was applied along the z axis ($H^{ext}=H_z^{ext}$) to lift magnetizations off the xy plane by 45° before acoustic excitation, so that the torque exerted by the effective magnetoelastic field on the magnetizations was maximized. The dipolar coupling field is calculated as $H^{dip}=(0, 0, -M_s m_z)$. In electrically insulating heterostructures, the $H_z^{emw}(z=z', t)$ at location z' contributed by the magnetic dipole at location $z=z^0$ is approximated as $$H_{z^0,x}^{emw} = \pm\frac{1}{2}[\nabla \times M(z = z^0, t)]_y dz, \quad (8)$$

$$H_{z^0,y}^{emw} = \mp\frac{1}{2}[\nabla \times M(z = z^0, t)]_x dz, \quad (9)$$

where the upper sign is for $z'>z^0$ and the lower sign is for $z'<z^0$. The total $H^{emw}(z=z', t)$ is contributed by the magnetic dipoles at different location $z^0$ and calculated as an integral of $H_z^{emw}$ over the entire heterostructure.

The electric field component $E_x(t)$ of the magnetic dipole radiation is obtained by an inverse Fourier transformation of its frequency domain component $E_x(\omega)$, which is obtained via solving the plane wave equation, $$\frac{\partial^2 E_x(z, \omega)}{\partial z^2} + \omega^2 \mu_0 \varepsilon_0 \varepsilon_r(\omega) E_x(z, \omega) = i\mu_0 \omega \partial_z M_y(z, \omega), \quad (10)$$

where $\varepsilon_0$ and $\mu_0$ are vacuum permittivity and permeability, $\varepsilon_r(\omega)$ is frequency-dependent relative permittivity containing both the real and imaginary parts, with $\varepsilon_r(\omega)=\varepsilon_r'(\omega)+i\varepsilon_r''(\omega)$. The Eq. (10) is numerically solved using a transfer-matrix algorithm. (Michalski, Krzysztof A. *Journal of Quantitative Spectroscopy, and Radiative Transfer* 226 (2019)).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can be construed to mean only one or can be construed to mean "one or more". Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A heterostructure comprising:
   a metal layer; and
   a superlattice comprising a series of adjacent bilayers disposed along a length axis, each bilayer comprising a magnetic insulator layer comprising a magnetic insulator selected from $MgAl_{0.5}Fe_{1.5}O_4$, $Y_3Fe_5O_{12}$, and $Gd_3Fe_5O_{12}$, and a dielectric layer comprising $MgAl_2O_4$, wherein the magnetic insulator layers in the superlattice have equal thicknesses and the dielectric layers in the superlattice have equal thicknesses, and further wherein the superlattice is either directly adjacent to the metal layer or separated from the metal layer by an intervening layer.

2. The heterostructure of claim 1, wherein the magnetic insulator is the $MgAl_{0.5}Fe_{1.5}O_4$.

3. The heterostructure of claim 2, wherein the magnetic insulator layers have a thickness in the range from 5 nm to 20 nm.

4. The heterostructure of claim 2, wherein the superlattice has 5 to 20 magnetic insulator layers.

5. The heterostructure of claim 1, wherein the metal layer is directly adjacent to a first magnetic insulator layer of the superlattice.

6. The heterostructure of claim 1, further comprising a thermal insulation layer between the metal layer and the superlattice.

7. The heterostructure of claim 6, wherein the thermal insulator layer is composed of the same material as the dielectric layers and has a greater thickness than the dielectric layers.

8. The heterostructure of claim 7, wherein the magnetic insulator is the $MgAl_{0.5}Fe_{1.5}O_4$.

9. A radiation source for emitting electromagnetic radiation comprising:
   a light-to-acoustic transducer layer, wherein the light-to-acoustic transducer layer is a metal layer; and
   a superlattice comprising a series of adjacent bilayers disposed along a length axis, each bilayer comprising a magnetic insulator layer comprising a magnetic insulator selected from $MgAl_{0.5}Fe_{1.5}O_4$, $Y_3Fe_5O_{12}$, and $Gd_3Fe_5O_{12}$, and a dielectric layer comprising $MgAl_2O_4$, wherein the magnetic insulator layers in the superlattice have equal thicknesses and the dielectric layers in the superlattice have equal thicknesses, and further wherein the superlattice is either directly adjacent to the metal layer or separated from the metal layer by an intervening layer; and
   a femtosecond pulsed laser optically coupled to the light-to-acoustic transducer layer, opposite the thermal insulation layer.

10. The radiation source of claim 9, further comprising a thermal insulation layer between the light-to-acoustic transducer layer and the superlattice.

11. The radiation source of claim 9, wherein the magnetic insulator is the $MgAl_{0.5}Fe_{1.5}O_4$.

12. The radiation source of claim 11, wherein the magnetic insulator layers have a thickness in the range from 5 nm to 20 nm.

13. The radiation source of claim 12, wherein the superlattice has 5 to 20 magnetic insulator layers.

14. The radiation source of claim 9, wherein the light-to-acoustic transducer layer is an aluminum layer.

15. The radiation source of claim 9, wherein the magnetic insulator layers have thicknesses in the range from 5 nm to 20 nm.

16. The radiation source of claim 9, wherein the superlattice has from 5 to 20 magnetic insulator layers.

17. A phased array comprising:
a plurality of radiation sources for emitting electromagnetic radiation, the radiation sources comprising:
   a light-to-acoustic transducer layer, wherein the light-to-acoustic transducer layer is a metal layer; and
   a superlattice comprising a series of adjacent bilayers disposed along a length axis, each bilayer comprising a magnetic insulator layer comprising a magnetic insulator selected from $MgAl_{0.5}Fe_{1.5}O_4$, $Y_3Fe_5O_{12}$, and $Gd_3Fe_5O_{12}$, and a dielectric layer comprising $MgAl_2O_4$ wherein the magnetic insulator layers in the superlattice have equal thicknesses and the dielectric layers in the superlattice have equal thicknesses, and further wherein the superlattice is either directly adjacent to the metal layer or separated from the metal layer by an intervening layer; and a laser system comprising:
   at least one femtosecond pulsed laser for generating a plurality of femtosecond pulsed laser beams that are optically coupled to the light-to-acoustic transducer layers of the radiation sources; and
   a time delay control system for introducing an adjustable time delay in the femtosecond pulsed laser beams arriving at the light-to-acoustic transducer layers of the radiation sources.

18. A heterostructure comprising:
a metal layer; and
a superlattice comprising a series of adjacent bilayers disposed along a length axis, each bilayer comprising a magnetic insulator layer comprising $Gd_3Fe_5O_{12}$ and a dielectric layer comprising $Gd_3Ga_5O_{12}$, wherein the magnetic insulator layers in the superlattice have equal thicknesses and the dielectric layers in the superlattice have equal thicknesses, and further wherein the superlattice is either directly adjacent to the metal layer or separated from the metal layer by an intervening layer.

* * * * *

UNITED STATES PATENT AND TRADEMARK OFFICE
CERTIFICATE OF CORRECTION

PATENT NO. : 11,817,242 B2
APPLICATION NO. : 17/528937
DATED : November 14, 2023
INVENTOR(S) : Jiamian Hu et al.

It is certified that error appears in the above-identified patent and that said Letters Patent is hereby corrected as shown below:

In the Specification

Column 8, Line 1:
Delete the phrase "A is the wavelength" and replace with --$\lambda$ is the wavelength--.

Column 8, Line 48:
Delete the phrase "48997-49006 (2024" and replace with --48997-49006 (2021).--.

Column 12, Line 6:
Delete the phrase "peak frequency, where" and replace with --peak frequency $f^*$, where--.

Column 13, Lines 55-56:
Delete the phrase "($\varepsilon$max=0.3% in MAFO) but different durations z=5.6 ps," and replace with --($\varepsilon_{max}$=0.3% in MAFO) but different durations $\tau$=5.6 ps,--.

Column 13, Line 57:
Delete the phrase "duration z" and replace with --duration $\tau$--.

In the Claims

Claim 17, Column 17, Line 14:
Delete the phrase "$Gd_3Fe_{5O12}$," and replace with --$Gd_3Fe_5O_{12}$,--.

Signed and Sealed this
Twenty-third Day of April, 2024

Katherine Kelly Vidal
*Director of the United States Patent and Trademark Office*